United States Patent
Rosenberg et al.

(10) Patent No.: US 11,460,924 B2
(45) Date of Patent: Oct. 4, 2022

(54) SYSTEM AND METHOD FOR DETECTING AND CHARACTERIZING INPUTS ON A TOUCH SENSOR SURFACE

(71) Applicant: Sensel Inc., Mountain View, CA (US)

(72) Inventors: Ilya Daniel Rosenberg, Mountain View, CA (US); John Aaron Zarraga, Mountain View, CA (US); Tomer Moscovich, Mountain View, CA (US)

(73) Assignee: Sensel, Inc., Mountain View, CA (US)

( * ) Notice: Subject to any disclaimer, the term of this patent is extended or adjusted under 35 U.S.C. 154(b) by 0 days.

(21) Appl. No.: 17/184,486

(22) Filed: Feb. 24, 2021

(65) Prior Publication Data

US 2021/0181850 A1    Jun. 17, 2021

Related U.S. Application Data

(63) Continuation of application No. 16/727,774, filed on Dec. 26, 2019, now Pat. No. 10,963,059, which is a
(Continued)

(51) Int. Cl.
*G06F 3/01*     (2006.01)
*G06F 3/04883*  (2022.01)

(52) U.S. Cl.
CPC .......... *G06F 3/016* (2013.01); *G06F 3/04883* (2013.01)

(58) Field of Classification Search
CPC .... G06F 3/04146; G06F 3/016; G06F 3/0202; G06F 3/045; G06F 3/0485;
(Continued)

(56) References Cited

U.S. PATENT DOCUMENTS 8,981,242 B2    3/2015  Bayramoglu
9,019,207 B1    4/2015  Hamburgen et al.
(Continued)

FOREIGN PATENT DOCUMENTS

CN    101828161 B    4/2013
EP      0469255 A1    2/1992
(Continued)

OTHER PUBLICATIONS

ESSR received in EP Application No. 17880897.8 dated Jul. 3, 2020.
(Continued)

*Primary Examiner* — Rodney Amadiz
(74) *Attorney, Agent, or Firm* — Run8 Patent Group, LLC; Peter Miller; Alexander Rodriguez

(57) ABSTRACT

One variation of a system for interfacing a computer system and a user includes: a touch sensor defining a touch sensor surface and extending over an array of sense electrode and drive electrode pairs; a vibrator coupled to the touch sensor surface; and a controller configured to: detect application of an input onto the touch sensor surface and a force magnitude of the first input at a first time; execute a down-click cycle in response to the force magnitude exceeding a threshold magnitude by driving the vibrator to oscillate the touch sensor surface; map a location of the input on the touch sensor surface to a key of a keyboard represented by the touch sensor surface; and output a touch image representing the key and the force magnitude of the input on the touch sensor surface at approximately the first time.

20 Claims, 12 Drawing Sheets

Related U.S. Application Data continuation of application No. 15/845,751, filed on Dec. 18, 2017, now Pat. No. 10,564,839, which is a continuation-in-part of application No. 15/476,732, filed on Mar. 31, 2017, now Pat. No. 10,331,265.

(60) Provisional application No. 62/343,453, filed on May 31, 2016, provisional application No. 62/316,417, filed on Mar. 31, 2016.

(58) Field of Classification Search
CPC ............ G06F 3/03543; G06F 3/04883; G06F 3/03547; G06F 2203/04105
See application file for complete search history.

(56) References Cited

U.S. PATENT DOCUMENTS

| | | | |
|---|---|---|---|
| 9,158,377 B2 | 10/2015 | Shinozaki | |
| 9,829,981 B1 | 11/2017 | Ji | |
| 10,101,859 B2 | 10/2018 | Jin | |
| 10,209,846 B2 | 2/2019 | Wang et al. | |
| 10,459,542 B1 | 10/2019 | Costante et al. | |
| 10,564,839 B2 | 2/2020 | Rosenberg et al. | |
| 10,963,059 B2* | 3/2021 | Rosenberg | G06F 3/04883 |
| 2002/0149561 A1 | 10/2002 | Fukumoto et al. | |
| 2005/0038944 A1 | 2/2005 | Harada et al. | |
| 2005/0180082 A1 | 8/2005 | Nakamura et al. | |
| 2007/0015966 A1 | 1/2007 | Niwa et al. | |
| 2009/0256817 A1 | 10/2009 | Perlin et al. | |
| 2010/0141606 A1 | 6/2010 | Bae et al. | |
| 2010/0156818 A1 | 6/2010 | Burrough et al. | |
| 2011/0025631 A1 | 2/2011 | Han | |
| 2011/0025648 A1 | 2/2011 | Laurent et al. | |
| 2011/0090151 A1* | 4/2011 | Huang | G06F 3/0237 345/168 |
| 2011/0134061 A1 | 6/2011 | Lim | |
| 2011/0248957 A1 | 10/2011 | Park | |
| 2012/0154316 A1 | 6/2012 | Kono | |
| 2014/0008203 A1 | 1/2014 | Nathan et al. | |
| 2014/0055407 A1 | 2/2014 | Lee et al. | |
| 2014/0362014 A1 | 12/2014 | Ullrich et al. | |
| 2015/0002416 A1 | 1/2015 | Koike et al. | |
| 2015/0054768 A1 | 2/2015 | Grant et al. | |
| 2015/0091858 A1 | 4/2015 | Rosenberg et al. | |
| 2015/0153829 A1* | 6/2015 | Shiraishi | G06F 1/1626 345/173 |
| 2015/0185848 A1 | 7/2015 | Levesque et al. | |
| 2016/0165931 A1 | 6/2016 | Lengerich et al. | |
| 2016/0195931 A1* | 7/2016 | Czelnik | G06F 3/167 345/173 |
| 2016/0259411 A1 | 9/2016 | Yoneoka et al. | |
| 2016/0370899 A1* | 12/2016 | Chang | G06F 3/04142 |
| 2017/0285848 A1 | 10/2017 | Rosenberg et al. | |
| 2017/0336891 A1 | 11/2017 | Rosenberg et al. | |
| 2017/0344115 A1 | 11/2017 | Ji | |
| 2018/0059791 A1 | 3/2018 | Hajati | |
| 2019/0212842 A1 | 7/2019 | Hinson et al. | |
| 2019/0265834 A1 | 8/2019 | Rosenberg et al. | |
| 2019/0339776 A1 | 11/2019 | Rosenberg et al. | |
| 2021/0333880 A1 | 10/2021 | Junus et al. | |

FOREIGN PATENT DOCUMENTS

| | | | |
|---|---|---|---|
| EP | 2375308 | A1 | 10/2011 |
| EP | 3043240 | A1 | 7/2016 |
| JP | H11212725 | A | 8/1999 |
| JP | 2004310518 | A | 11/2004 |
| WO | 2010104953 | A1 | 9/2010 |
| WO | 2012081182 | A1 | 6/2012 |
| WO | 2013104919 | A1 | 7/2013 |
| WO | 2013186844 | A1 | 12/2013 |
| WO | 2016035628 | A1 | 3/2016 |
| WO | 2018112466 | A1 | 6/2018 |

OTHER PUBLICATIONS

International Search Report received in PCT/US17/67064 dated Mar. 6, 2018.
Office Action received in EP Application No. EP17776861.1 dated Oct. 6, 2021.
ESSR received in EP Application No. 19764741.5 dated Nov. 15, 2021.
International Search Report received in PCT/US19/21466 dated Jun. 21, 2019.
ISR received in PCT/US2021/040404 dated Oct. 20, 2021.
Notice of Allowance received in U.S. Appl. No. 16/277,774 dated Feb. 24, 2021.
Notice of Allowance received in U.S. Appl. No. 17/092,002 dated Sep. 20, 2021.
Notice of Allowance received in U.S. Appl. No. 17/367,572 dated Feb. 3, 2022.
Office Action received in U.S. Appl. No. 16/297,426 dated Apr. 22, 2020.
Office Action received in Japanese Patent Application No. 2020-546911 dated Nov. 8, 2021.
Office Action received in U.S. Appl. No. 15/845,751 dated Jun. 11, 2019.
Office Action received in U.S. Appl. No. 16/405,937 dated Apr. 23, 2020.
Office Action received in U.S. Appl. No. 17/154,944 dated Jul. 29, 2021.
Office Action Received in U.S. Appl. No. 15/476,732 dated Oct. 2, 2018.

* cited by examiner

SYSTEM AND METHOD FOR DETECTING AND CHARACTERIZING INPUTS ON A TOUCH SENSOR SURFACE

CROSS-REFERENCE TO RELATED APPLICATIONS

This application is a continuation of U.S. patent application Ser. No. 16/727,774, filed on 26 Dec. 2019, which is a continuation of U.S. patent application Ser. No. 15/845,751, filed on 18 Dec. 2017, which is a continuation-in-part application of U.S. patent application Ser. No. 15/476,732, filed on 31 Mar. 2017, which claims the benefit of U.S. Provisional Application No. 62/316,417, filed on 31 Mar. 2016, and U.S. Provisional Application No. 62/343,453, filed on 31 May 2016, which are hereby incorporated in their entireties by this reference.

This application is related to U.S. patent application Ser. No. 14/499,001, filed on 26 Sep. 2014, which is hereby incorporated in its entirety by this reference.

TECHNICAL FIELD

This invention relates generally to the field of touch sensors and more specifically to a new and useful system for human-computer interfacing in the field of touch sensors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System and Method

Figure 1:
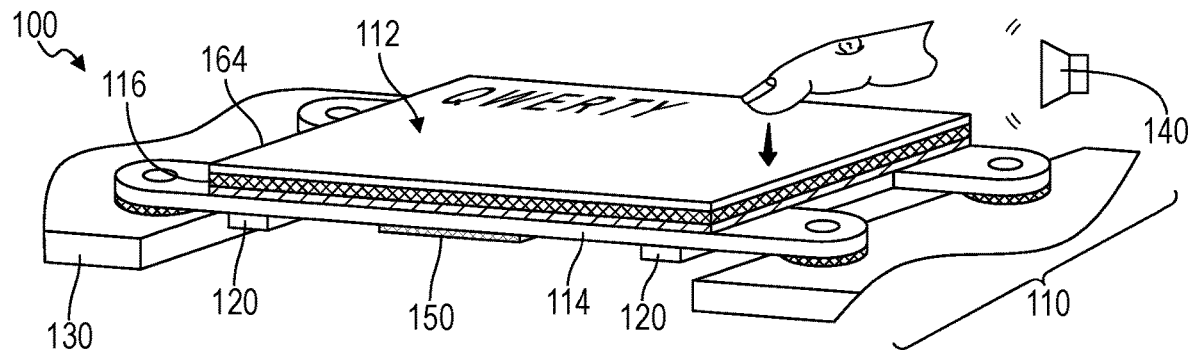
FIG. 1 is a schematic representation of a system.

As shown in FIG. 1, a system 100 for human-computer interfacing includes: a touch sensor 110 comprising a rigid backing, comprising an array of sense electrode and drive electrode pairs 116, and defining a touch sensor surface 112 and extending over the array of sense electrode and drive electrode pairs 116; a first vibrator 120 coupled to the touch sensor 110 and configured to oscillate a mass within a plane parallel to the touch sensor surface 112; and a coupler 132 arranged below the touch sensor 110 and configured to absorb displacement of the touch sensor surface 112 during activation of the first vibrator 120. The system 100 also includes a controller 150 configured to: detect application of a first input onto the touch sensor surface 112 and a first force magnitude of the first input at a first time based on a first change in resistance between a first sense electrode and drive electrode pair 116 in the touch sensor 110; execute a down-click cycle in response to the first force magnitude exceeding a first threshold magnitude by driving the first vibrator 120 to oscillate the touch sensor surface 112; map a first location of the first input on the touch sensor surface 112 to a key of a keyboard represented by the touch sensor surface 112; and output a first touch image representing the key and the first force magnitude of the first input on the touch sensor surface 112 at approximately the first time.

Figure 2:
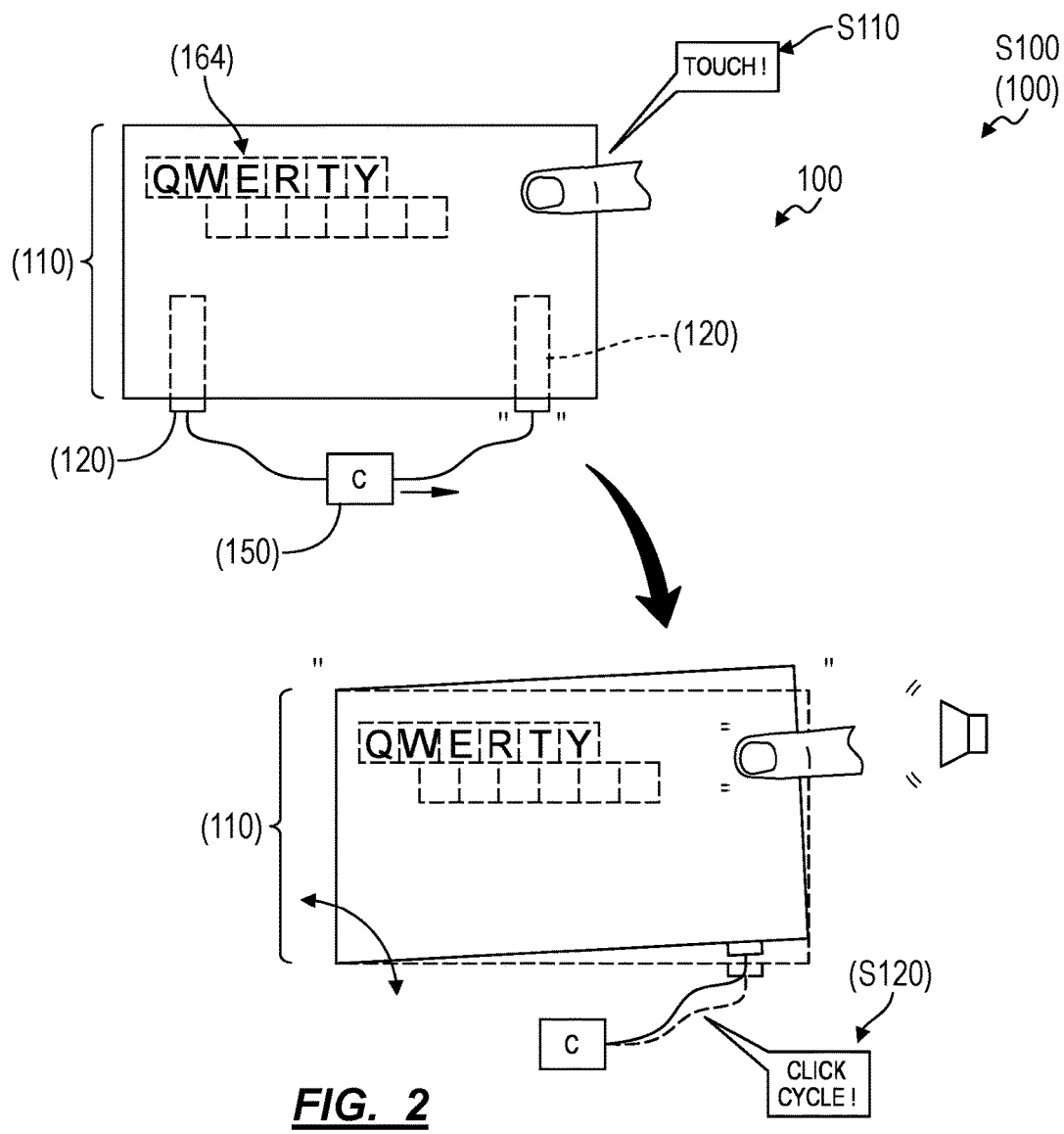
FIG. 2 is a flowchart representation of one variation of the system.
Figure 8:
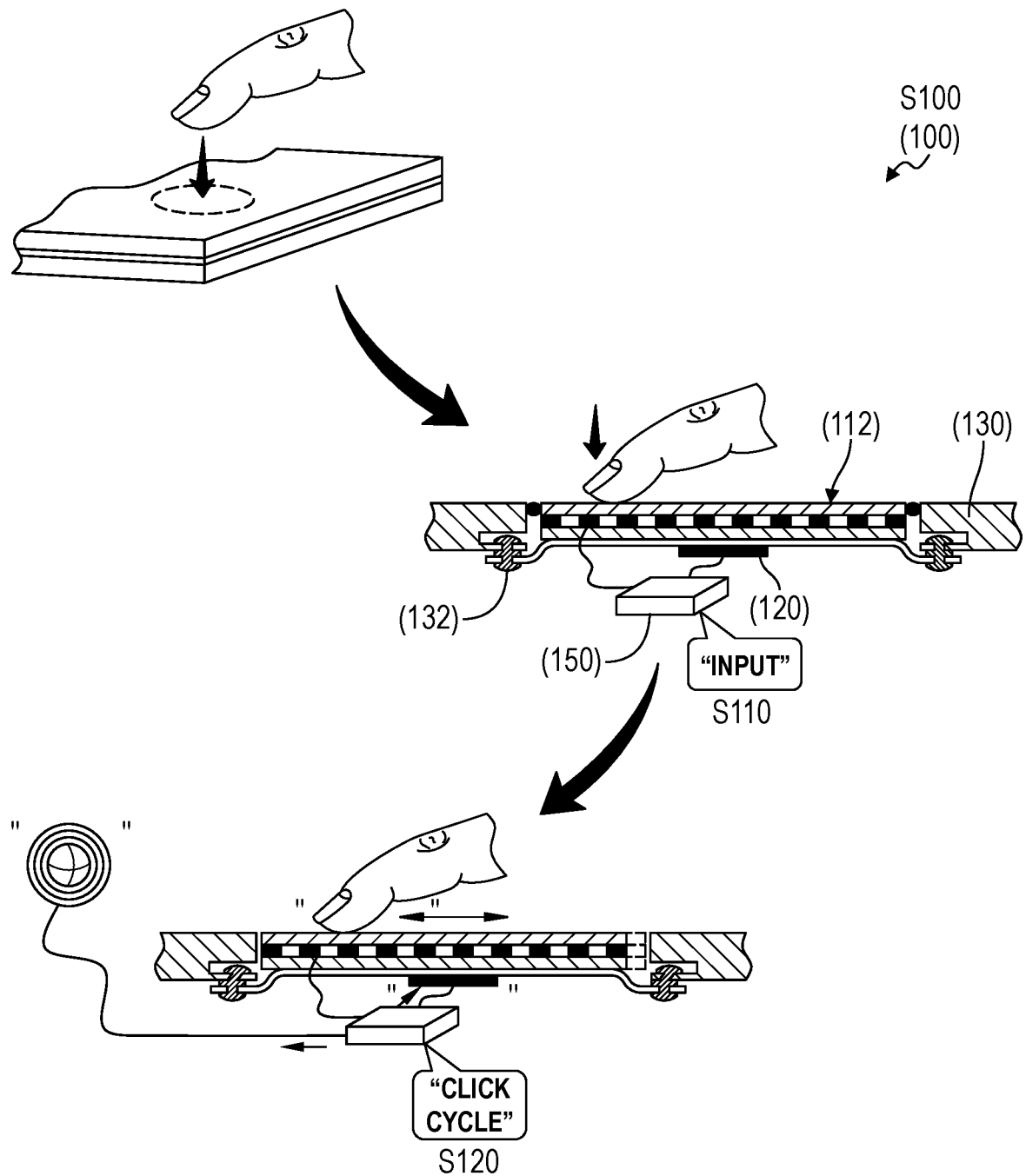
FIG. 8 is a flowchart representation of one variation of the system.

One variation of the system 100 includes a touch sensor 110; a first vibrator 120; a second vibrator 120; a speaker; and a controller 150. The touch sensor 110 includes: a substrate 114 mounted to a chassis 130 of a computing device and configured to shift within a vibration plane parallel to a broad planar face of the substrate 114; an array of sense electrode and drive electrode pairs 116 patterned across the substrate 114; a resistive layer 124 arranged over the substrate 114 and including a material exhibiting changes in local bulk resistance responsive to variations in magnitude of force applied to the touch sensor surface 112; and an overlay 164 arranged over the resistance layer opposite the substrate 114 and defining a touch sensor surface 112. The first vibrator 120 is coupled to a first end of the substrate 114 and is configured to vibrate the first end of the substrate 114 within the vibration plane during a first click cycle. The second vibrator 120 is coupled to a second end of the substrate 114 opposite the first end and is configured to vibrate the substrate 114 within the vibration plane during a second click cycle. The speaker is configured to replay a click sound during the first click cycle and the second click cycle. The controller 150 is configured: to trigger the speaker to replay the click sound and to trigger the first vibrator 120 to execute a first click cycle in response to application of a force exceeding a threshold force magnitude on a first region of the touch surface over the first end of the substrate 114; to trigger the speaker to replay the click sound and to trigger the second vibrator 120 to execute a second click cycle in response to application of a force exceeding the threshold force magnitude on a second region of the touch surface over the second end of the substrate 114; and to output a command in response to application of a force exceeding the threshold force magnitude on the touch sensor surface 112, as shown in FIGS. 2 and 8.

The system 100 executes a method S100 for detecting and characterizing inputs including: at a first time, detecting application of a first input onto a touch sensor surface 112 and a first force magnitude of the first input in Block S110; in response to the first force magnitude exceeding a first threshold magnitude, actuating a first vibrator 120 coupled to the touch sensor surface 112 according to a down-click cycle in Block S120; and, at a second time succeeding the first time, detecting a second force magnitude of the first input in Block S130. The method S100 also includes, in response to a second threshold magnitude exceeding the second force magnitude, the second threshold magnitude less than the first threshold magnitude: mapping a first location of the first input on the touch sensor surface 112 at approximately the second time to a particular key of a keyboard associated with a region of the touch sensor surface 112 coincident the first location in Block S140; and outputting an identifier of the particular key and the first force magnitude of the first input on the touch sensor surface 112 at approximately the second time in Block S150.

2. Applications

Generally, the system 100 functions as a human-computer interface device that detects inputs by a user (e.g., a human user), transforms these inputs into machine-readable commands, communicates these commands to a computing device, and supplies feedback (e.g., haptic feedback) in real-time to indicate to a user that an input was detected. In particular, the system 100 includes a touch sensor 110 through which inputs are detected, a haptic feedback module (e.g., a speaker and two or more vibrators) through which feedback is supplied to a user, and a controller 150 that outputs commands to a connected computing device based on inputs detected through the touch sensor 110 and that triggers haptic feedback through the haptic feedback module. The system 100 can, therefore, execute Blocks of the method S100 to detect and respond to inputs on the touch sensor surface 112.

Figure 7A:
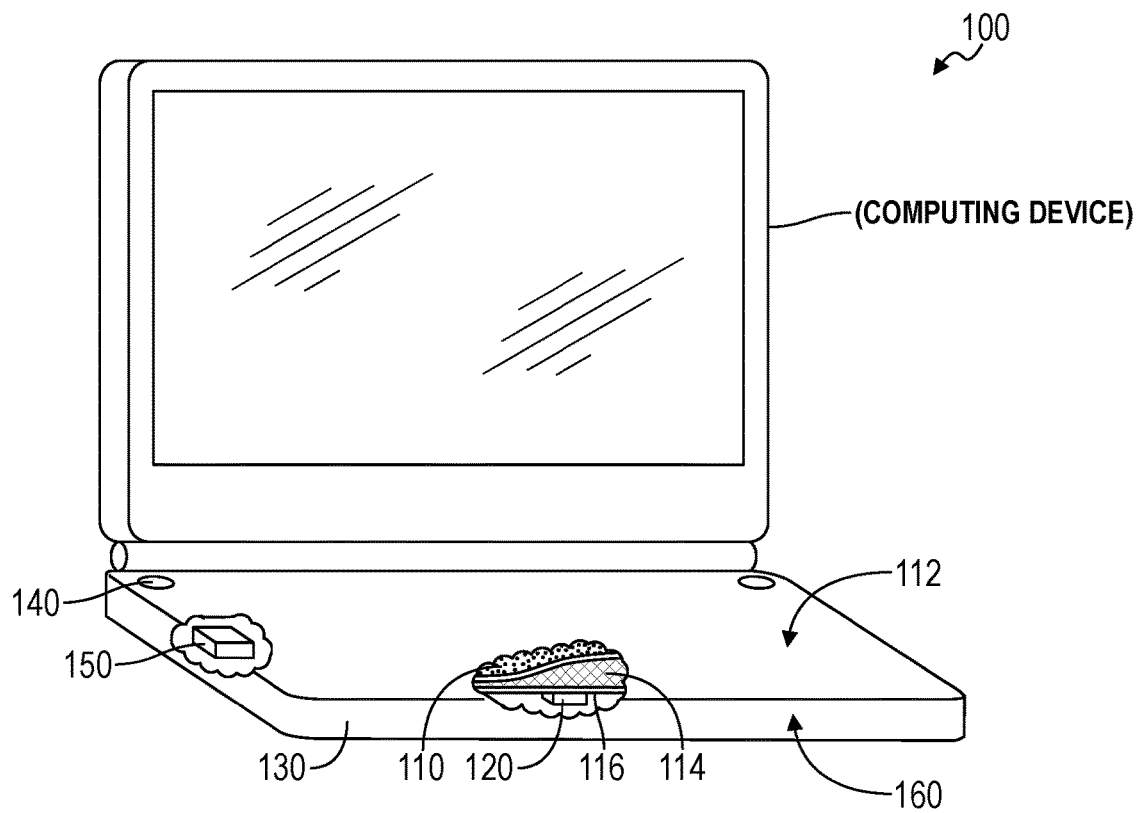
FIGS. 7A and 7B is a schematic representation of one variation of the system.
Figure 7B:
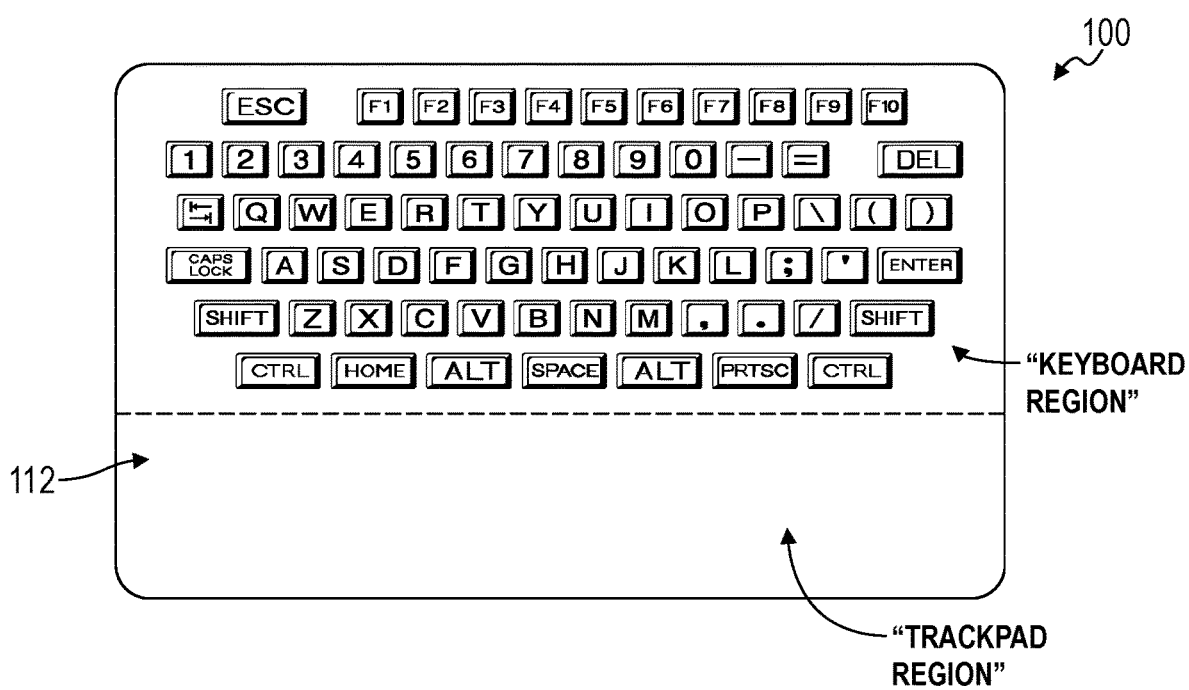

The system 100 can be integrated into a computing device to define a touch sensor surface 112 (e.g., a substantially flat touch-sensitive surface), such as spanning an integrated trackpad and/or an integrated keyboard. The system 100 detects inputs on the touch sensor surface 112, such as application of a finger or stylus that exceeds a threshold minimum applied force or pressure, and issues audible and/or vibratory (hereinafter "haptic") feedback to a user in response to such an input in order to mimic the auditory and tactile response of a mechanical snap button that is depressed and released. The system 100 can thus provide a user with a perception that a mechanical button was depressed and released though the system 100 defines a touch sensor surface 112 that is vertically constrained and features no local moving elements. When integrated into a computing device, such as a laptop computer (as shown in FIGS. 7A AND 7B), the system 100 can output keystrokes, cursor vectors, and/or scroll commands, etc. based on inputs detected on the touch sensor surface 112, and the computing device can execute processes and/or update a graphical user interface rendered on an integrated display based on such commands received from the system 100. Alternatively, the system 100 can be integrated into a peripheral device, such as a peripheral keyboard or a peripheral keyboard with integrated trackpad, which can cooperate with a computing device to execute processes and/or update a graphical user interface rendered on a display integrated into the computing device.

In one implementation in which the system 100 defines a keyboard, the system 100 can associate discrete regions on the touch sensor surface 112 with key output commands. The system 100 can output a key output command and trigger one of the first and second vibrators to execute a click cycle in response to detection of an input on a corresponding key region of the touch sensor surface 112. The system 100 can execute a click cycle to mimic depression (and release) of a mechanical keyboard key when a key region of the touch sensor surface 112 is depressed by actuating the first vibrator 120 and/or second vibrator 120 to oscillate a region of the touch sensor surface 112 coincident the input.

Figure 12A:
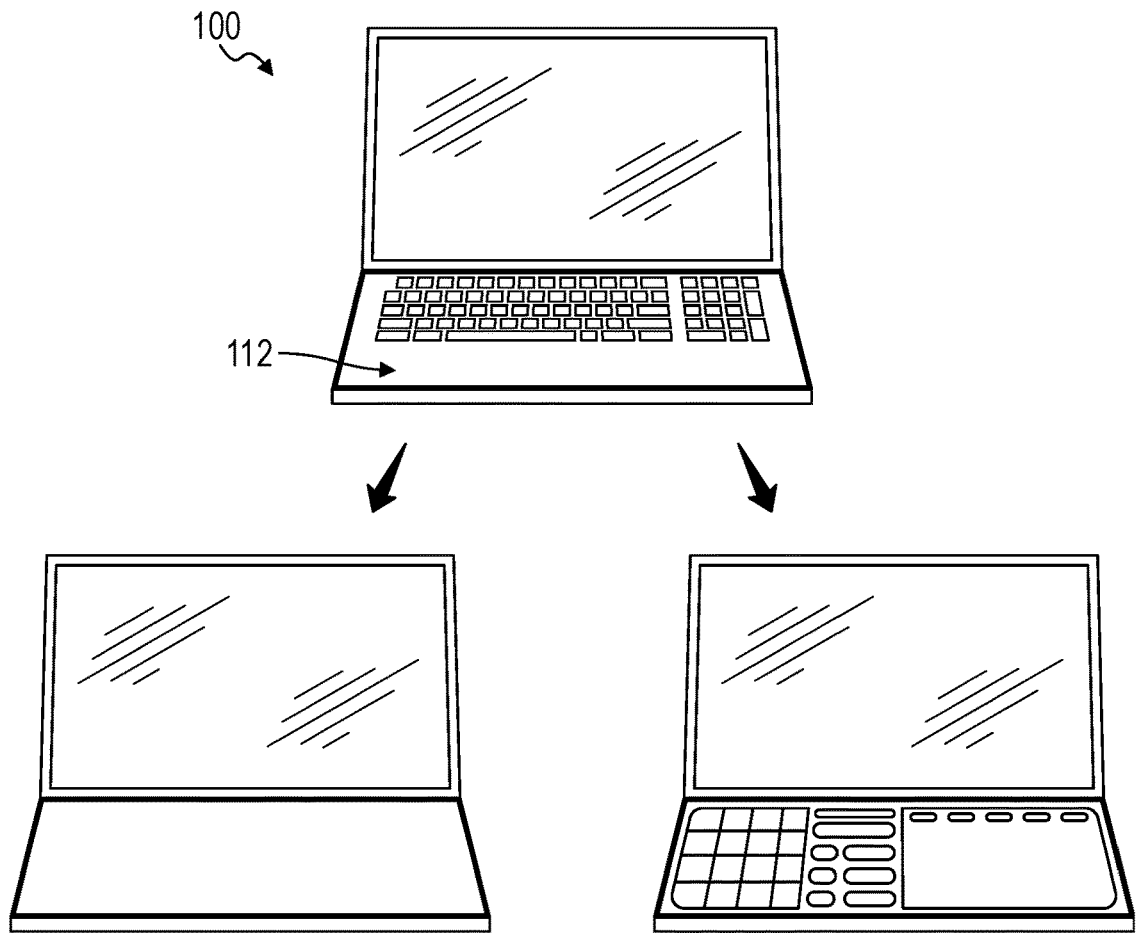
FIGS. 12A and 12B are schematic representations of one variation of the system.
Figure 12B:
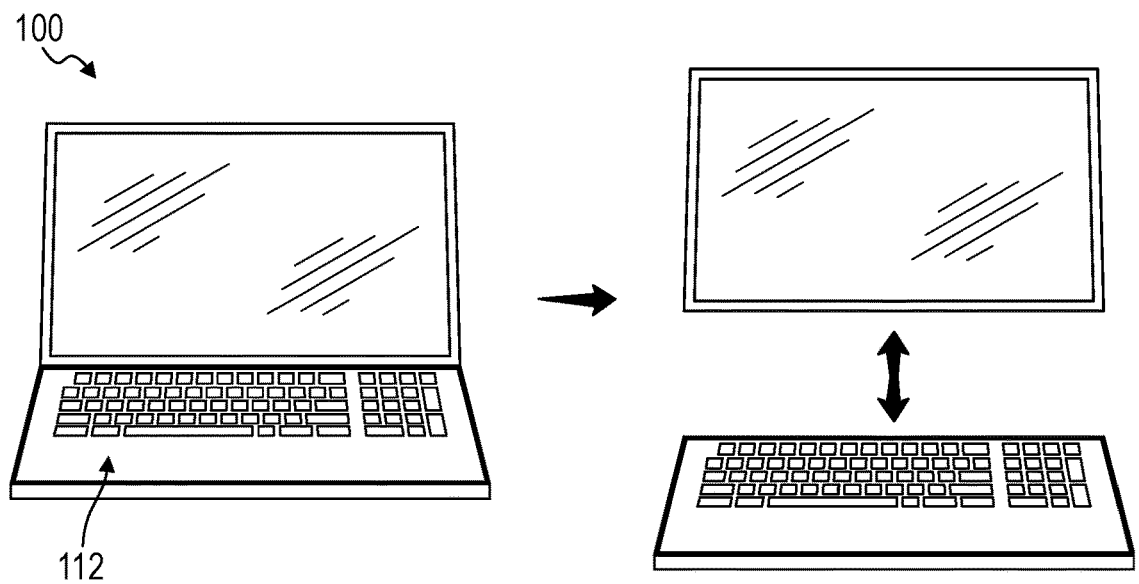

As shown in FIGS. 12A and 12B, the system defines a non-mechanical structure that executes the method S100 in order to catalyze, for the user, a perception of a mechanical key through remote vibration and/or audio signals; the system can manifest as a keyboard surface that can be dynamic, virtually modified to represent different types of keys, different keyboard spacing, transition into a trackpad, or other surface without compromising the tactile response of a mechanical keyboard. In particular, the system 100 can execute a down-click cycle to provide a user with the perception of depression of the mechanical keyboard key by actuating one or more vibrators and/or audio drivers 140 proximal the input according to an oscillation profile (e.g., oscillation frequency, amplitude, and duration) corresponding to a force or pressure magnitude of the input, a velocity of application of the input, proximity of the input to a centroid of a key of the keyboard, etc. Similarly, the system 100 can execute an up-click cycle in Block S132 to mimic retraction of a mechanical key of a mechanical keyboard in response to release of the input from the touch sensor surface 112 by actuating one or more vibrators and/or audio drivers 140 proximal the input according to a release oscillation profile corresponding to a force or pressure magnitude of the release of the input, a velocity of application of the release of the input, proximity of the input to a centroid of a key of the keyboard, etc. Therefore, the system 100 can oscillate select regions of the touch sensor surface 112 and emit click-sounds defined as a function of force, velocity, duration, and/or other characteristics of application and release of an input to the touch sensor surface 112 in order to replicate a sensation of application and release of a mechanical key of a mechanical keyboard.

For example, the system 100 can: activate the vibrator 120 and trigger the audio driver 140 to output a click sound when an input applied to the touch sensor surface 112 exceeds a first threshold force (or pressure) magnitude in order to replicate a tactile feel and audible sound of a mechanical key being depressed; and then activate the vibrator 120 and trigger the audio driver 140 to output a (lower-frequency) click sound when the same input is lifted to less than a second threshold magnitude—less than the first threshold magnitude—on the touch sensor surface 112 in order to replicate a tactile feel and audible sound of a depressed mechanical key being released. The system 100 can thus provide the user with a tactile impression that a key was depressed and released though the system 100 itself defines a substantially rigid exo-structure with no external moving parts or surfaces (e.g., a button).

The system 100 can also reconfigure the keyboard in software automatically and in real-time by shifting, resizing, and/or redefining key regions—such as if a user selects an alternative keyboard layout (e.g., a French or Mandarin keyboard from a QWERTY keyboard), reorients the keyboard, or zooms the keyboard in or out (e.g., by entering a pinch or expand gesture on the touch sensor surface 112)—and continue to provide haptic feedback through the haptic feedback module, which may be arranged substantially remotely from the touch sensor surface 112. Therefore, the system 100 can reconfigure placement and orientation of keys of the keyboard on the touch sensor surface 112 to align with user preferences (e.g., to be more ergonomic).

The system 100 is described herein as a reconfigurable pressure-sensitive touch sensor surface 112 with keyboard overlay 164 that can be integrated into or connected to a computing device (e.g., a laptop computer, a tablet) and that detects inputs on the touch sensor surface 112, provides haptic feedback to a user in response to such inputs, and outputs commands (e.g., selection of a particular key of the keyboard) to another processing unit or controller 150 within the integrated or connected computing device based on these inputs. However, the system 100 can alternatively define standalone or peripheral devices that can be connected to and disconnected from a computing device and can output commands to the computing device when connected based on inputs detected on the touch sensor surface 112. For example, the system 100 can alternatively define a remote controller 150, a handheld computer pointing device (or "mouse"), a game controller 150, a wall phone, a smartphone, or a wearable, etc.

3. Touch Sensor

Figure 9:
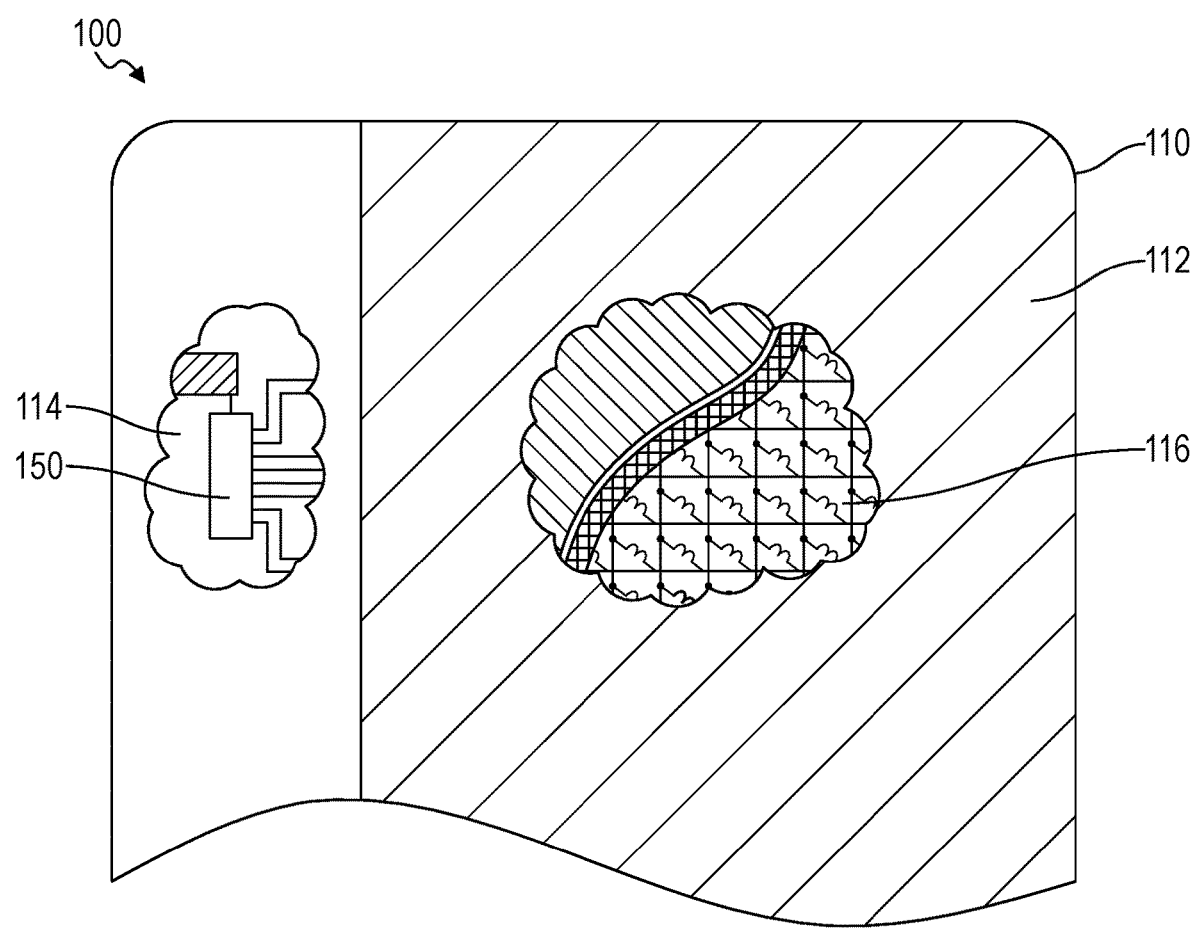
FIG. 9 is a schematic representation of one variation of the system.

As shown in FIGS. 1 and 9, the touch sensor 110 includes: an array of sense electrode and drive electrode pairs 116 patterned across a substrate 114 (e.g., a fiberglass PCB); and a resistive layer 124 arranged over the substrate 114 in contact with the sense electrode and drive electrode pairs 116, defining a material exhibiting variations in local bulk resistance and/or local contact resistance responsive to variations in applied force, and defining a touch sensor surface 112 opposite the substrate 114. As described in U.S. patent application Ser. No. 14/499,001, the resistive touch sensor 110 can include a grid of inter-digitated drive electrodes and sense electrodes patterned across the substrate 114. The resistive layer 124 can span gaps between each drive and sense electrode pair across the substrate 114 such that, when a localized force is applied to the touch sensor surface 112, the resistance across an adjacent drive and sense electrode pair varies proportionally (e.g., linearly, inversely, quadratically, or otherwise) with the magnitude of the applied force. As described below, the controller 150 can read resistance values across each drive and sense electrode pair within the touch sensor 110 and can transform these resistance values into a position and magnitude of one or more discrete force inputs applied to the touch sensor surface 112.

In one implementation, the system 100 includes a rigid substrate 114, such as in the form of a rigid PCB (e.g., a fiberglass PCB) or a PCB on a touch sensor surface 112 (e.g., an aluminum backing plate); and rows and columns of drive and sense electrodes are patterned across the top of the substrate 114 to form an array of sense electrodes. The force-sensing layer is installed over the array of sense electrodes and connected to the substrate 114 about its perimeter.

4. Controller

Generally, the controller 150 functions to drive the touch sensor 110, to read resistance values between drive and sense electrodes during a scan cycle, and to transform resistance data from the touch sensor 110 into locations and magnitudes of force inputs over the touch sensor surface 112. The controller 150 can also function to transform locations and/or magnitudes of forces recorded over two or more scan cycles into a keystroke corresponding to a particular key of a keyboard, a gesture, a cursor motion vector, or other command and to output such command to a computing device in which the system 100 is installed or integrated. For example, the controller 150 can access preprogrammed command functions stored in memory in the computing device, such as command functions including a combination of trackpad and keyboard values readable by the computing device to move a virtual cursor, to scroll through a text document, to expand a window, to translate and rotate a 2D or 3D virtual graphical resource within a window, or to enter text and keyboard shortcuts, etc.

In one implementation, the controller 150 includes: an array column driver (ACD); a column switching register (CSR); a column driving source (CDS); an array row sensor (ARS); a row switching register (RSR); and an analog to digital converter (ADC); as described in U.S. patent application Ser. No. 14/499,001. In this implementation, the touch sensor 110 can include a variable impedance array (VIA) that defines: interlinked impedance columns (IIC) coupled to the ACD; and interlinked impedance rows (IIR) coupled to the ARS. During a resistance scan period: the ACD can select the IIC through the CSR and electrically drive the IIC with the CDS; the VIA can convey current from the driven IIC to the IIC sensed by the ARS; the ARS can select the IIR within the touch sensor 110 and electrically sense the IIR state through the RSR; and the controller 150 can interpolate sensed current/voltage signals from the ARS to achieve substantially accurate detection of proximity, contact, pressure, and/or spatial location of a discrete force input over the touch sensor 110 for the resistance scan period within a single sampling period.

In one implementation, a row of drive electrodes in the touch sensor 110 can be connected in series, and a column of sense electrodes in the resistive touch sensor 110 can be similarly connected in series. During a sampling period, the controller 150 can: drive a first row of drive electrodes to a reference voltage while floating all other rows of drive electrodes; record a voltage of a first column of sense electrodes while floating all other columns of sense electrodes; record a voltage of a second column of sense electrodes while floating all other columns of sense electrodes; record a voltage of a last column of sense electrodes while floating all other columns of sense electrodes; drive a second row of drive electrodes to the reference voltage while floating all other rows of drive electrodes; record a voltage of the first column of sense electrodes while floating all other columns of sense electrodes; record a voltage of the second column of sense electrodes while floating all other columns of sense electrodes; record a voltage of the last column of sense electrodes while floating all other columns of sense electrodes; and finally drive a last row of drive electrodes to the reference voltage while floating all other rows of drive electrodes. The controller 150 can then record a voltage of the first column of sense electrodes while floating all other columns of sense electrodes; record a voltage of the second column of sense electrodes while floating all other columns of sense electrodes; and record a voltage of the last column of sense electrodes while floating all other columns of sense electrodes in Block Silo. The controller 150 can thus sequentially drive rows of drive electrodes in the resistive touch sensor 110; and sequentially read resistance values (e.g., voltages) from columns of sense electrodes in the resistive touch sensor 110 in Block Silo.

The controller 150 can therefore scan drive and sense electrode pairs (or "sense electrodes") during a sampling period in Block Silo. The controller 150 can then merge resistance values read from the touch sensor 110 during one sampling period into a single touch image representing locations and magnitudes of forces (or pressures) applied across the touch sensor surface 112 in Block S130. The controller 150 can also: identify discrete input areas on the touch sensor surface 112 (e.g., by implementing blob detection to process the touch image); calculate a pressure magnitude on an input area based on total force applied across the input area; identify input types (e.g., finger, stylus, palm, etc.) corresponding to discrete input areas; associate discrete input areas with various commands; and/or label discrete input areas in the touch image with pressure magnitudes, input types, commands, etc. in Block S130. The controller 150 can repeat this process to generate a (labeled) touch image during each sampling period during operation of the system 100.

The controller 150 can be arranged on the substrate 114 to form a fully contained touch sensor 110 that: receives power from the connected computing device; detects inputs on the touch sensor surface 112; outputs haptic feedback, such as in the form of a mechanical vibration and sound, in response to detected inputs; and outputs commands corresponding to detected inputs on the touch sensor surface 112. Alternatively, all or portions of the controller 150 can be remote from the substrate 114, such as arranged within the connected computing device and/or physically coextensive with one or more processors within the computing device.

5. Haptics

The system 100 includes a haptic feedback module, including a vibrator 120 and an audio driver 140 (e.g., a speaker). Generally, in response to an input—on the touch sensor surface 112—that exceeds a threshold force or a threshold pressure, the controller 150 can simultaneously trigger the vibrator 120 to output a vibratory signal and can trigger the speaker to output an audible signal (hereinafter a "click cycle") that together mimic the feel and sound, respectively, of a mechanical snap button when actuated, as shown in FIG. 8.

The vibrator 120 can include a mass on an oscillating linear actuator, an eccentric mass on a rotary actuator, a mass on an oscillating diaphragm, or any other suitable type of vibratory actuator. In one example, the vibrator 120 includes a mass coupled to an oscillating linear actuator that oscillates the mass along a single actuation axis when actuated. In this example, the vibrator 120 can be coupled to the substrate 114 with the actuation axis of the vibrator 120 parallel to the vibration plane of the system 100, and the coupler 132 can constrain the substrate 114 in all but one degree of translation substantially parallel to the actuation axis of the vibrator 120. In another example, the vibrator 120 includes an eccentric mass coupled to a rotary actuator that rotates the eccentric mass about an axis of rotation when actuated. In this example, the vibrator 120 can be coupled to the substrate 114 with the axis of rotation of the vibrator 120 perpendicular to the vibration plane of the system 100, and the coupler 132 can constrain the substrate 114 in all but two degrees of translation normal to the axis of rotation of the vibrator 120. Alternatively, the vibrator 120 can include a mass on an oscillating diaphragm or any other suitable type of vibratory actuator. The vibrator 120 can also include a piezoelectric actuator, a solenoid, an electrostatic motor, a voice coil, or an actuator of any other form or type configured to oscillate the substrate 114 in the vibration plane. Furthermore, the vibrator 120 can be mounted on the underside of the substrate 114 opposite the resistive layer 124 in order to reduce the lateral and/or longitudinal footprint of the system 100, or the vibrator 120 can be mounted on the top of the substrate 114 adjacent and outside of the sense and drive electrodes in order to reduce the height of the system 100.

The vibrator 120 can therefore be mounted directly on the substrate 114 or on a rigid backing coupled to the substrate 114 opposite the resistive layer 124. For example, the system 100 can include an array of sense electrode and drive electrode pairs 116 patterned across a first side of a substrate 114 (e.g., a "PCB"), and the vibrator 120 can be installed proximal the center of the substrate 114 opposite the sense and drive electrodes. The system 100 can also include multiple vibrators, such as one vibrator 120 arranged under each half or under each quadrant of the touch sensor surface 112, as described below. In this implementation, the controller 150 can actuate all vibrators in the set during a click cycle. Alternatively, the controller 150 can selectively actuate one or a subset of the vibrators during a click cycle, such as a single vibrator 120 nearest the centroid of a newest input detected on the touch surface between a current scan cycle and a last scan cycle, as described below. However, the haptic feedback module can include any other number of vibrators in any other configuration and can actuate any other one or combination of vibrators during a click cycle.

The vibrator 120 can exhibit a resonant (e.g., natural) frequency, and the controller 150 can trigger the actuator to oscillate at this resonant frequency during a click cycle. For example, when the system 100 is first powered on, the controller 150 can execute a test routine, including ramping the vibrator 120 from a low frequency to a high frequency, detecting a resonant frequency between the low frequency and the high frequency, and storing this resonant frequency as an operating frequency of the vibrator 120 during the current use session.

5.1 Audio Driver

The system 100 can also include a speaker, buzzer, and/or other audio driver 140 configured to output a "click" sound during a click cycle. In one implementation, the speaker is arranged on the substrate 114 and moves with the substrate 114 during a click cycle. In this implementation, the resistive layer 124 can include one or more perforations that define a speaker grill over the speaker, and the speaker can output sound through the perforation(s) to a user. Alternatively, the perimeter of the resistive layer 124 can be offset inside a receptacle in the computing device in which the substrate 114 and resistive layer 124 are housed in order to form a gap between the computing device and the resistive layer 124, and the speaker can output sound that is communicated through this gap to a user. Alternatively, the speaker can be arranged remotely from the substrate 114. For example, the speaker can define a discrete speaker arranged within the computing device's chassis 130. In these examples, the computing device can thus include a primary speaker (or a set of primary speakers), and the system 100—integrated into the computing device—can include a secondary speaker that replays a click sound—independent of the primary speakers—during a click cycle to mimic the sound of an actuated mechanical snap button.

In one implementation, the system 100 includes a housing 160 (as described below) that defines a receptacle configured to accept the touch sensor 110, the controller 150, the vibrator 120, and/or the audio driver 140. The audio driver 140 can mount to the touch sensor 110 opposite the touch sensor surface 112 within the housing 160. The touch sensor surface 112 can, thus, define a keyboard surface inset from an edge of the receptacle to form a gap configured to pass sound output by the audio driver 140. Therefore, the housing 160 and other components of the system 100 can cooperate to form a gap or perforation through which the audio driver 140 can output the sound. In one variation, the housing 160 can define the gap surrounding individual keys of the keyboard, such that sound emitted from the audio driver 140 can be communicated through the keyboard itself (as opposed to from a side or a bottom portion of the keyboard) for the sensation that the "click" sound results directly from depression of a key of the keyboard.

Alternatively, the housing 160 also includes: a speaker grill, such as in the form of an open area or perforations across a region of the bottom of the housing 160 opposite the touch sensor surface 112, for which sound output by the speaker is communicated outside of the housing 160; and a set of pads (or "feet") across its bottom surface that function to maintain an offset (e.g., 0.085") gap between the speaker grill and a flat surface on which the system 100 is placed in order to limit muffling of sound output from the speaker by this adjacent surface. In particular, the system 100 can include: a housing 160 containing the touch sensor 110, the vibrator 120, the audio driver 140, and the controller 150 and defining a speaker grill adjacent the audio driver 140 and facing opposite the touch sensor surface 112; and one or more pads, each pad extending from the housing 160 opposite the touch sensor surface 112, defining a bearing surface 181 configured to slide across a table surface, and configured to offset the speaker grill above the table surface by a target gap distance. Thus, with the system 100 placed on a substantially flat surface, the speaker and speaker grill can cooperate to output sound that is reflected between the bottom surface of the housing 160 and the adjacent surface; and this sound may disperse laterally and longitudinally outward from the housing 160 such that a user may audibly perceive this sound substantially regardless of his orientation relative to the system 100. Alternatively, the housing 160 can define one or more speaker grills on its side(s), across its top adjacent the touch sensor surface 112, or in any other position or orientation. Yet alternatively, the haptic feedback module can include a speaker cavity that vibrates with the speaker when the speaker is driven in order to output a "click" sound from the system 100.

Alternatively, in the implementation in which the system 100 is integrated into a computing device as a keyboard, the speaker can be physically coextensive with the primary speaker of the computing device, and the primary speaker can output both a "click" sound and recorded and live audio (e.g., music, an audio track of a video replayed on the computing device, live audio during a video or voice call) substantially simultaneously. Furthermore, when an audio system within the computing device is muted by a user, the computing device can mute all audio output from the computing device except "click" sounds in response to inputs on the touch sensor surface 112. Similarly, the computing device can trigger the speaker to output "click" sounds at a constant decibel level (or "loudness") regardless of an audio level set at the computing device in order to maintain a substantially uniform "feel" of an input on the touch sensor surface 112 despite various other functions executed by and settings on the computing device.

5.2 Click Cycle

In response to an input on the touch sensor surface 112 that exceeds a total or peak threshold force (or pressure) magnitude, the controller 150 drives both a vibrator 120 nearest the location of the detected input and the speaker substantially simultaneously in a "click cycle" in order to both tactilely and audibly mimic actuation of a mechanical snap button. For example, in response to detection of such an input, the controller 150 can: determine the location of the input; select a particular vibrator 120—from a set of vibrators coupled to the substrate 114—nearest the location of the input in Block S120; trigger a motor driver to drive the particular vibrator 120 according to a square wave for a target click duration (e.g., 250 milliseconds) while simultaneously replaying a "click" sound byte through the speaker in Block S121.

During a click cycle, the controller 150 can also lag or lead replay of the click sound byte relative to the vibrator 120 drive signal, such as by +/−50 milliseconds, to achieve a particular haptic response during a click cycle. Similarly, during a click cycle, the controller 150 can delay audio output by the speaker by an "onset time" corresponding to a time for the vibrator 120 to reach a peak output power or peak oscillation amplitude and within a maximum time for a human to perceive the audio and vibration components of the click cycle as corresponding to the same event (e.g., several milliseconds). For example, for a vibrator 120 characterized by an onset time of 10 milliseconds, the controller 150 can delay audio output by the speaker by 5-10 milliseconds after the vibrator 120 is triggered during a click cycle. Therefore, when the controller 150 detects application of a force—that exceeds a first threshold force (or pressure) magnitude—on the touch sensor surface 112 at a first time in Block S110, the controller 150 can: activate the vibrator 120 at a second time immediately succeeding the first time (e.g., within 50 milliseconds of the first time and during application of the first input on the touch sensor surface 112); and activate the audio driver 140 at a third time succeeding the second time by a delay duration corresponding to an onset time of the vibrator 120 (e.g., 10 milliseconds) in which the vibrator 120 reaches a minimum oscillation magnitude in Block S121.

As described above, the controller 150 can execute a click cycle in response to an input on the touch sensor surface 112 that meets or exceeds one or more preset parameters. For example, the controller 150 can initiate a click cycle in response to detection of an input on the touch sensor surface 112 that exceeds a threshold pressure corresponding to a common pressure needed to actuate a mechanical button or snapdome. In this example, the controller 150 can compare total or maximum pressure of an input detected on the touch sensor surface 112 to a preset static pressure threshold to identify or characterize the input. Alternatively, the controller 150 can implement a user-customized pressure threshold, such as based on a user preference for greater input sensitivity (corresponding to a lower pressure threshold) or based on a user preference for lower input sensitivity (corresponding to a greater pressure threshold) set through a graphical user interface executing on a computing device connected to the system 100. In another example, the controller 150 can segment the touch sensor surface 112 into two or more active and/or inactive regions, such as based on a current mode or orientation of the system 100, and the controller 150 can discard an input on an inactive region of the touch sensor surface 112 but initiate a click cycle when an input of sufficient magnitude is detected within an active region of the touch sensor surface 112.

In this implementation, the controller 150 can additionally or alternatively assign unique threshold force (or pressure) magnitudes to discrete regions of the touch sensor surface 112 and selectively execute click cycles through a common haptic feedback module in response to application of forces (or pressures)—on various regions of the touch sensor surface 112—that exceed assigned threshold magnitudes. For example, the controller 150 can: assign a first threshold magnitude to regions of the touch sensor surface 112 corresponding to keys typically depressed by a pinky and/or thumb; and assign a second threshold magnitude—greater than the first threshold magnitude in order to reject aberrant clicks on the touch sensor surface 112—to a region of the touch sensor surface 112 corresponding to keys infrequently depressed (e.g., "function" keys and/or a "caps lock" key).

The system 100 can therefore detect inputs of different force magnitudes on the touch sensor surface 112, assign an input type to an input based on its magnitude, serve different haptic feedback through the vibrator 120 and speaker based on an input's assigned type, and output different control functions based on an input's assigned type.

Figure 10A:
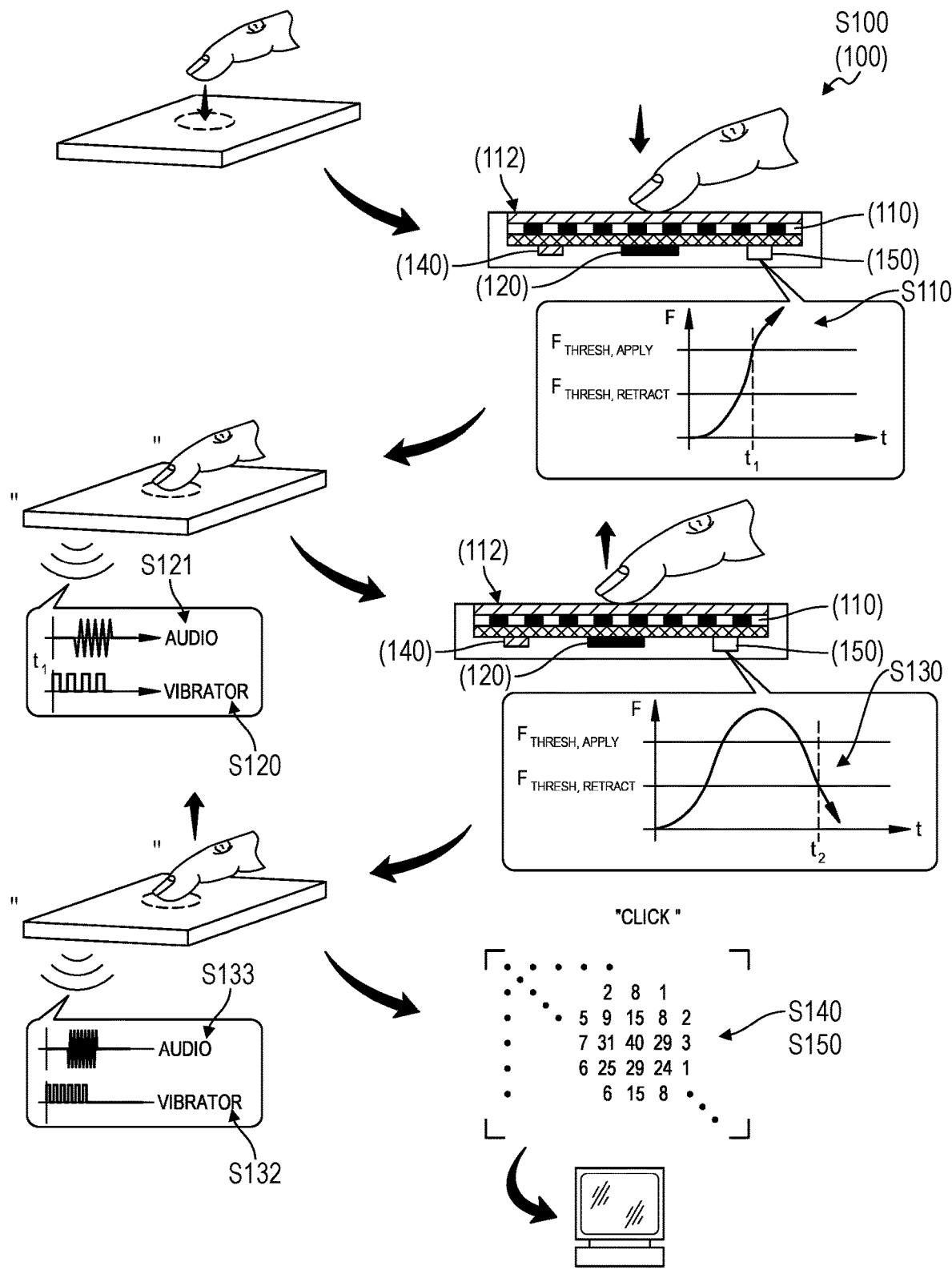
FIGS. 10A and 10B are flowchart representations of one variation of the method.
Figure 10B:
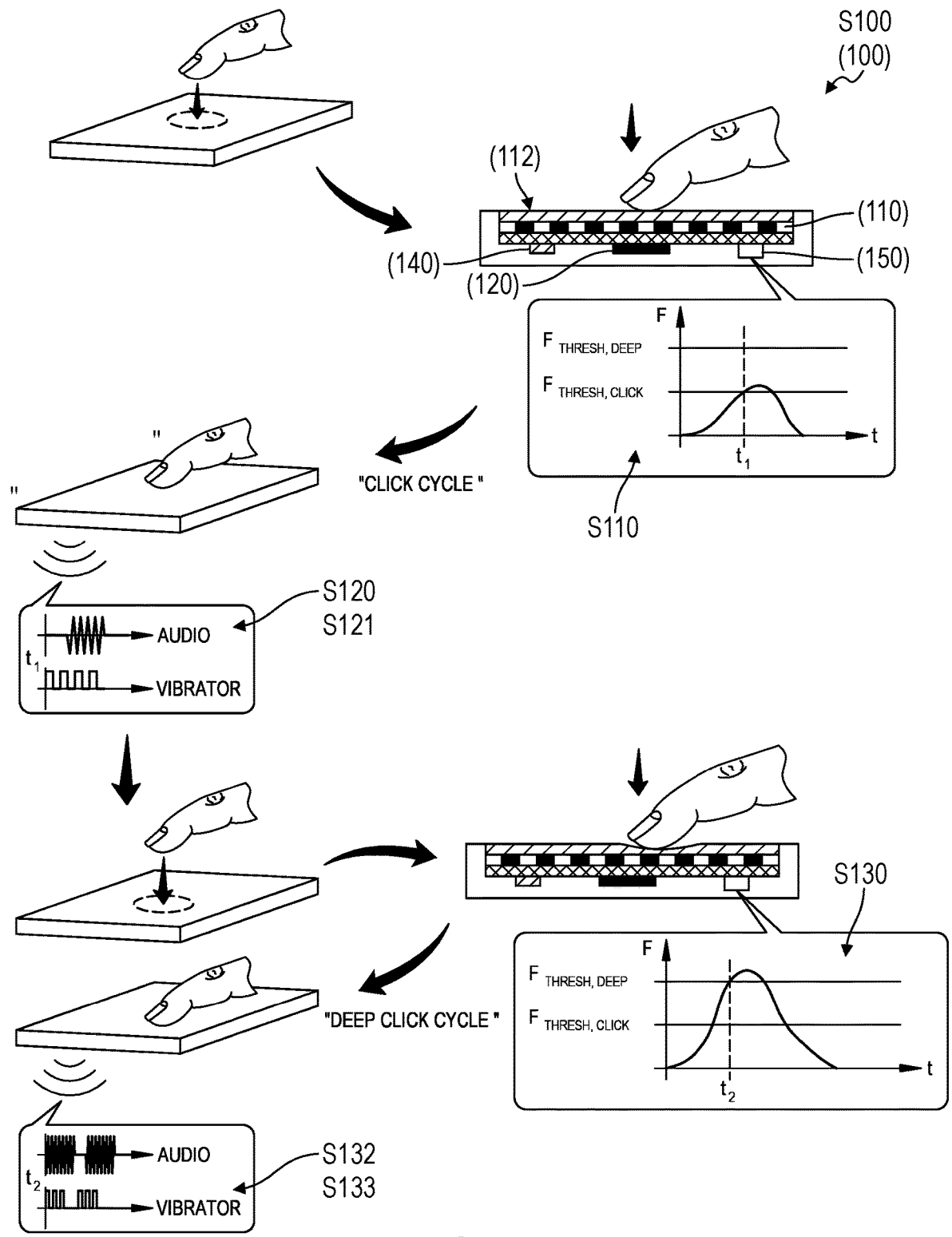

In one variation, the controller 150: executes a "standard click cycle" in response to a "standard click input" of total or peak force magnitude greater than a first force (or pressure) threshold and less than a second force threshold; and executes a "deep click cycle" in response to a "deep click input" of total or peak force magnitude that exceeds the second force threshold as shown in FIG. 10B. In this variation, during a deep click cycle, the controller 150 can drive a particular vibrator 120 nearest the location of the deep click input for an extended duration (e.g., 750 milliseconds) in order to tactilely indicate to a user that a deep click input was detected and handled. The controller 150 can similarly deactivate the audio driver 140 or drive the audio driver 140 over an extended duration during a deep click cycle. In one example, the controller 150 can execute a keyboard "shift" control function in response to a standard click input on a "shift key" region of a keyboard defined on the touch sensor surface 112 and can execute a "caps lock" control function in response to a deep click input on the "shift key" region of the keyboard. In a similar example, the controller 150 can output a lowercase "a" keystroke in response to a standard click input on an "a" key region of the keyboard defined on the touch sensor surface 112 and can execute a capital "A" keystroke response to a deep click input on the "a" key region of the keyboard.

In one example, the controller 150: detects application of a first input on the touch sensor surface 112 and a first force magnitude of the first input at a first time based on a first change in resistance between a first sense electrode and drive electrode pair 116 below the touch sensor surface 112; executes a first click cycle over a first duration (e.g., a standard click cycle) and labels the first input as of a first input type in response to the first force magnitude falling between the first threshold magnitude and the second threshold magnitude. In this example, the controller 150 can also: detect application of a second input onto the touch sensor surface 112 and a second force magnitude of the second input at a second time based on a second change in resistance between a second sense electrode and drive electrode pair 116 below the touch sensor surface 112; and execute a second click cycle over a second duration exceeding the first duration (e.g., a deep click cycle) and label the second input as of a second input type distinct from the first input type in response to the second force magnitude exceeding the second threshold magnitude.

In another example, the controller 150 can transition or toggle between input modes in response to a deep click input on the touch sensor surface 112, such as between a first mode in which the controller 150 outputs relative position change commands to move a cursor and a second mode in which the controller 150 outputs absolute position commands defining the location of the cursor within a view window (e.g., over a desktop).

The controller 150 can similarly implement multi-level click cycles, such as three, four, or more additional click cycles as an object is depressed on the touch sensor surface 112 at increasing force magnitudes. The controller 150 can also output various commands responsive to application of a force on the touch sensor surface 112 that falls within one of multiple preset force magnitude ranges. For example, for an input on a region of the touch sensor surface 112 corresponding to a delete key, the controller 150 can output a command to delete a single symbol, to delete a whole word, to delete a whole sentence, and to delete a whole paragraph based on the magnitude of an applied force that falls into one of four preset and increasing force magnitude ranges.

The controller 150 can implement these haptic effects responsive to multiple discrete inputs applied to the touch sensor surface 112 simultaneously or in rapid sequence. For example, when a user places multiple fingers in contact with the touch sensor surface 112, the controller 150 can trigger a click cycle in response to detection of each finger on the touch sensor surface 112, such as within multiple click cycles overlapping based on times that magnitudes of forces applied by each of these fingers exceed a common threshold magnitude (or exceed threshold magnitudes assigned to corresponding regions of the touch sensor surface 112). The controller 150 can implement the foregoing methods and techniques responsive to various force (or pressure) magnitude transitions by each of the user's fingers, such as including "down" click cycles, "up" click cycles, "deep" click cycles, multiple-level click cycles, etc. for each finger in contact with the touch sensor surface 112.

5.3 Hysteresis

In another implementation, the controller 150 implements hysteresis to trigger multiple elements of a single click cycle. For example, the controller 150 can trigger a "down" click cycle, as described above, in response to a detected force on the touch sensor surface 112 that exceeds four ounces and can trigger an "up" click cycle (e.g., a shorter and higher-frequency variant of the down click cycle) when a detected force applied to the touch sensor surface 112 by the same object drops below two ounces. In this example, the controller 150 can execute a "down" click cycle in which the vibrator 120 is driven at greater amplitude and the speaker outputs a lower-frequency sound than for an "up" click cycle in order to simulate a physical button in which greater applied downward force is required to depress the button downward but in which a finger or other object in contact with the button dampens the sound of the button depressing, thereby yielding a lower-pitch "snap down" feel than when the physical button is released. In this implementation, the controller 150 can implement similar methods and techniques to trigger the speaker: to replay a "down" audio track containing a primary tone of first frequency when an input detected on the touch sensor surface 112 exhibits an applied force exceeding a high threshold force (e.g., four ounces); and to replay an "up" audio track containing a primary tone of second frequency less than the first frequency when the same input on the touch sensor surface 112 exhibits an applied force that later drops below the low threshold force (e.g., two ounces). The controller 150 can thus vary haptic and tactile outputs of the system 100 based on force magnitudes of inputs on the touch sensor surface 112 and a current or last state of the system 100.

The controller 150 can additionally or alternatively implement per-finger haptic effects. For example, when a user places multiple fingers in contact with the touch sensor surface 112, the controller 150 can trigger a click cycle in response to detection of each finger on the touch sensor surface 112 and in response to various input transitions performed by the user's fingers, such as including "down" click cycles, "up" click cycles, "deep" click cycles, multiple-level click cycles, etc. for each finger in contact with the touch sensor surface 112. As described below, the controller 150 can selectively trigger a particular vibrator 120 nearest the location of an input once the input is detected or once an input transition at the location is detected.

The system 100 can therefore detect inputs of different force magnitudes on the touch sensor surface 112, assign an input type to an input based on its magnitude, serve different haptic feedback through the vibrator 120 and speaker based on an input's assigned type, and output different control functions based on an input's assigned type.

In one variation shown in FIG. 10A, the controller 150 implements hysteresis to trigger multiple click cycles during application and retraction of a single force input on the touch sensor surface 112. In particular, in this variation, the controller 150 selectively activates the vibrator 120 and the speaker when a force is both applied to the touch sensor surface 112 and when the force is released from the touch sensor surface 112 in order to tactilely and audibly replicate the feel and sound of a mechanical button being depressed and, later, released. To prevent "bouncing" when application of a force on the touch sensor surface 112 reaches a first threshold magnitude, the controller 150 can execute a single "down" click cycle—suggestive of depression of a mechanical button—for this input until the input is released from the touch sensor surface 112. However, the controller 150 can also execute an "up" click cycle—suggestive of release of a depressed mechanical button—as a force applied by the same input decreases to a second, lower threshold magnitude. Therefore, the controller 150 can implement hysteresis techniques to prevent "bouncing" in haptic responses to the inputs on the touch sensor surface 112, to indicate to a user that a force applied to the touch sensor surface 112 has been registered (i.e., has reached a first threshold magnitude) through haptic feedback, and to indicate to the user that the user's selection has been cleared and force applied to the touch sensor surface 112 has been registered (i.e., the applied force has dropped below a second threshold magnitude) through additional haptic feedback.

For example, the controller 150 can: trigger a "down" click cycle in response to detecting application of an input—on the touch sensor surface 112—of force magnitude that exceeds 120 grams; and can trigger an "up" click cycle (e.g., a shorter and higher-frequency variant of the down click cycle) as the input is released from the touch sensor surface 112 and the applied force on the touch sensor surface 112 from this input drops below 60 grams. In this example, the controller 150 can execute a "down" click cycle in which the vibrator 120 is driven at greater amplitude and/or greater frequency and in which the speaker outputs a lower-frequency sound than for an "up" click cycle. For example, the system 100 can execute the down-click cycle by driving the vibrator 120 at a first oscillation frequency and triggering the audio driver 140 to output a click sound at a first audio frequency; and execute the up-click cycle by driving the first vibrator 120 at an oscillation frequency greater than the first oscillation frequency in Block S132 and triggering the audio driver 140 to output the click sound at the second audio frequency greater than the first audio frequency in Block S133. Generally, in this example, the controller 150 can define the frequency of the "down" click to be proportional to the force magnitude of the input, such that inputs of greater force magnitude correspond with higher pitch audio signals and/or higher frequency vibration. Similarly, the controller 150 can define the duration of the "down" click to be proportional to the force magnitude of the input, such that inputs of greater force magnitude correspond with longer audio signals and/or longer vibration duration. Therefore, the controller 150 can execute a "down" click cycle that tactilely and audibly replicates depression of a mechanical button, which may require application of a force exceeding a transition force; and the controller 150 can execute an "up" click cycle that tactilely and audibly replicates release of the mechanical button, which may return to its original position only once the applied force on the mechanical button drops significantly below the transition force. Furthermore, contact between a mechanical button and a finger depressing the mechanical button may dampen both the sound and the rate of return of a depressed mechanical button, thereby yielding a faster and lower-pitch "snap down" feel and sound than when the physical button is released. The controller 150 can thus mimic the feel and sound of a mechanical button when depressed by executing a "down" click cycle; the controller 150 can mimic the feel and sound of a depressed mechanical button when released by executing an "up" click cycle responsive to changes in force applied by an object in contact with the touch sensor surface 112 over a period of time.

6. Vibrator Pairs

In one variation, the system 100 includes a set of vibrator 120 pairs coupled to the substrate 114, wherein each vibrator 120 in a pair of actuators is configured to execute a discrete element (or portion) of a click cycle.

In one implementation, in which the system 100 executes a "down" click cycle when the force magnitude of an input on the touch sensor surface 112 exceeds a high force magnitude (e.g., four ounces) and then executes an "up" click cycle when the force magnitude of the input drops below a low force magnitude (e.g., two ounces), as described above, the system 100 includes one or more vibration pairs, wherein each vibration pair includes a depress vibrator 120 and a release vibrator 120. In this implementation, the depress vibrator 120 can exhibit a first resonant frequency, and the release vibrator 120 can exhibit a second resonant frequency less than the first resonant frequency. For example, the depress vibrator 120 can include an eccentric mass smaller than the eccentric mass in the release vibrator 120 and/or exhibit a shorter throw than the release vibrator 120 such that the first vibrator 120 exhibits a higher resonant frequency than the release vibrator 120. The controller 150 can thus sequentially trigger the depress vibrator 120 to execute a down click cycle when an input is first detected by the touch sensor 110 and then trigger the release vibrator 120 to execute an up click cycle as the input is released from the touch sensor surface 112 in order to mimic a feel of a depression and release of a mechanical snap button, which may "feel" relatively stiffer upon depression than upon release to a human user. Furthermore, in this implementation, the depress and release vibrators can be packaged together into a single unit, such as with their linear oscillation paths parallel and offset.

For example, the system 100 can include a first vibrator 120 and a second vibrator 120 both coupled to the touch sensor 110 and configured to vibrate the touch sensor surface 112. Additionally, the system 100 can include a first audio driver 140 and a second audio driver 140 coupled to the touch sensor 110 and configured to output an audio signal in response to inputs exceeding a second threshold magnitude. In this example, the controller 150 is configured to: selectively drive the first vibrator 120 to oscillate the touch sensor surface 112 proximal the first input at approximately the first time in response to detecting application of the first input a first distance from the first vibrator 120 and a second distance from the second vibrator 120, the second distance exceeding the first distance, the first force magnitude of the first input exceeding the threshold magnitude. Therefore, the controller 150 can actuate the first vibrator 120 exclusively when the controller 150 detects inputs on the touch sensor surface 112 closer to the first vibrator 120 than the second vibrator 120. Similarly, the controller 150 is configured to selectively trigger the audio driver 140 to output a first audio signal proximal the first input at approximately the first time in response to detecting application of the first input a first distance from the first vibrator 120 and a second distance from the second vibrator 120, the second distance exceeding the first distance. Therefore, the controller 150 can actuate the first audio driver 140 exclusively when the controller 150 detects inputs on the touch sensor surface 112 closer to the first audio driver 140 than the second audio driver 140. Alternatively, the controller 150 can selectively drive the second vibrator 120 to oscillate the touch sensor surface 112 proximal the first input at approximately the first time and/or selectively trigger the second audio driver 140 to output a second audio signal proximal the first input at approximately the first time in response to detecting application of the first input a distance from the first vibrator 120 greater than a distance from the second vibrator 120. Therefore, the controller 150 can selectively actuate the second audio driver 140 and/or the second vibrator 120 exclusively when the controller 150 detects inputs on the touch sensor surface 112 closer to the second audio driver 140 and the second vibrator 120 than the first audio driver 140 and the first vibrator 120, respectively. However, the controller 150 can also drive the first vibrator 120 to oscillate the touch sensor surface 112 at a first frequency at approximately the first time; and drive the second vibrator 120 to oscillate the touch sensor surface 112 at a second frequency at approximately the first time in response to detecting application of the first input a distance from the first vibrator 120 and the (equal) distance from the second vibrator 120. Similarly, the controller 150 can trigger both the first audio driver 140 and the second audio driver 140 to output audio signals at approximately the first time. Therefore, the controller 150 can drive multiple vibrators and/or audio drivers 140 at approximately the same time when an input is equidistant and/or within a threshold offset from each vibrator 120 and/or audio driver 140.

Similarly, the system 100 can include vibrator 120 clusters, wherein each vibrator 120 cluster contains multiple vibrators, each vibrator 120 configured to execute one of various click cycle types. For example, in the implementation described above in which the controller 150 triggers vibrators to execute up, down, and deep click cycles, a vibrator 120 cluster can include: a depress vibrator 120 dedicated to executing down click cycles; a release vibrator 120 dedicated to executing up click cycles; and a deep depress vibrator 120 dedicated to executing deep press click cycles. In this example, the controller 150 can selectively trigger each of the depress, release, and deep depress vibrators to execute corresponding click cycles based on the force magnitude of a detected input on the touch sensor surface 112. Alternatively, each vibrator 120 cluster can include two or more vibrators, including a primary vibrator 120 and a secondary vibrator 120, and the controller 150 can trigger the primary vibrator 120 to execute each subsequent click cycle unless a click cycle is currently in process at the primary vibrator 120 or unless less than a threshold period of time has passed since the primary vibrator 120 completed a last click cycle, in which case the controller 150 triggers the secondary vibrator 120 to execute a next click cycle. Similarly, in these implementations, vibrators in a vibrator 120 cluster can be packaged together in a single package and mounted in-unit to the substrate 114.

However, the system 100 can include a vibrator 120 pair or vibrator 120 cluster containing any other number of like or dissimilar vibrators configured to execute click cycles of a particular type or of multiple unique types.

7. Housing

The housing 160 functions to contain and support elements of the system 100, such as the controller 150, the vibrator 120, the speaker, and the sense and drive electrodes of the touch sensor 110, as shown in FIGS. 1 and 2. As described above, the housing 160 can also define a set of feet (or "pads") that function to support the bottom of the housing 160 over a planar surface on which the system 100 is set upright. In this implementation, each foot can include a compressible or other vibration-damping material that functions to mechanically isolate the system 100 from the adjacent surface, thereby reducing rattle and substantially preserving vibration of the system 100 during a click cycle.

7.1 Coupler

The coupler 132 is configured to mount the substrate 114 to a chassis 130 of a computing device and to permit movement of the substrate 114 within a vibration plane parallel to a broad planar face of the substrate 114. Generally, the coupler 132 constrains the substrate 114 against the chassis 130 of a computing device (e.g., a laptop computer) but permits the substrate 114, the vibrator 120, and the resistive layer 124 to oscillate within a plane substantially parallel to the touch sensor surface 112 during a click cycle.

In one example in which the vibrator 120 oscillates a mass linearly along an X-axis of the system 100 perpendicular to the Z-axis and parallel to the vibration plane, the coupler 132 can (approximately) constrain the substrate 114 in five degrees of freedom, including rotation about any axis and translation along both the Y- and Z-axes of the system 100, and the coupler 132 can permit the substrate 114 to translate (substantially) only along the X-axis of the system 100 when the vibrator 120 is actuated during a click cycle. In another example in which the vibrator 120 includes an eccentric mass coupled to the output shaft of a rotary actuator and in which the output shaft of the rotatory actuator is normal to the touch sensor surface 112 (i.e., parallel to a Z axis of the system 100), the coupler 132 can (approximately) constrain the substrate 114 in four degrees of freedom, including rotation about any axis and translation along the Z axis, and the coupler 132 can permit the substrate 114 to translate along X and Y axes of the system 100 (i.e., in a plane parallel to the touch sensor surface 112) when the vibrator 120 is actuated during a click cycle.

In one implementation, the chassis 130 of the computing device defines a receptacle (e.g., a cavity) configured to receive the system 100, and the coupler 132 functions to locate the substrate 114 and the resistive layer 124 within the receptacle. The chassis 130 of the computing device can also define an overhang that extends over and into a receptacle to form an undercut around the cavity, and the coupler 132 can mount the substrate 114 to the underside of the overhang, such as via one or more mechanical fasteners, grommets 185, or an adhesive.

In one variation, the touch sensor 110 includes a touch sensor surface 112 that extends across the back side of the substrate 114 and that functions to support the substrate 114 against deflection out of the vibration plane, such as due to a downward force applied to the touch sensor surface 112. In this variation, the touch sensor surface 112 can include a fiberglass plate, a metal (e.g., aluminum) plate, a fiber-filled polymer plate, or a plate of any other material and can be bonded to the substrate 114 or fastened to the substrate 114, such as with a mechanical fastener 167 or grommet 185, and the touch sensor surface 112 can be coupled or fastened to the computing device chassis 130 to mount the substrate 114 and resistive layer 124 within the receptacle.

Alternatively, the substrate 114 can be of a rigid material and/or of a thickness such that the substrate 114 is sufficiently rigid to resist substantial deformation out of the vibration plane when a typical load is applied to the touch sensor surface 112. For example, the substrate 114 can include a 3 mm-thick fiberglass or carbon fiber PCB. The substrate 114 can additionally or alternatively include one or more steel, copper, or aluminum ribs soldered or riveted to the back side of the substrate 114 and spanning the length and/or width of the substrate 114 to improve rigidity of the substrate 114. The substrate 114 can thus be of a material and geometry and/or can include additional strengthening elements to increase the rigidity of the substrate 114 in the vibration plane but without adding substantial mass to the substrate 114 and resistive layer 124 assembly: in order to improve the responsiveness of the system 100 due to reduced absorption of vibration by the rigid substrate 114; and in order to increase the displacement of the substrate 114 and resistive layer 124 assembly per stroke of the vibrator 120 during a click cycle.

7.2 Grommets

In one implementation, the coupler 132 mounts the substrate 114 (or the touch sensor surface 112) to the computing device receptacle via elastic grommets 185 (e.g., "vibration-damping snap-in unthreaded spacers"). In one example shown in FIGS. 11D, 11E, 11F, and 11G the coupler 132 includes one cylindrical grommet 185—including two necks—inserted into a bore at each corner of the substrate 114 with the upper necks of the grommets 185 engaging their corresponding bores in the substrate 114. In this example, for each grommet 185, the coupler 132 also includes a rigid tab, such as a metal or fiberglass tab, including a first bore that engages the lower neck of the grommet 185 and a second bore laterally offset from the first bore and configured to mount to the computing device chassis 130 via a fastener 167, such as a screw, a nut, or a rivet. In this example, the rigid tabs can also be connected, such as to form a rigid frame that encircles the perimeter of the substrate 114 or in the form of a rigid plate that spans the back side of the substrate 114. In this example, each grommet 185 includes an enlarged section between the upper and lower necks that vertically offsets the substrate 114 above the tabs (or above the rigid frame, above the rigid plate) and that permits the substrate 114 to move laterally relative to the tabs (or relative to the rigid frame, relative to the rigid plate) while vertically supporting the substrate 114. In this example, each grommet 185 can be of silicone, rubber, or any other flexible or elastic material and can be characterized by a durometer sufficient to permit lateral deflection of the grommets 185 due to oscillation of the vibrator 120 during a click cycle but to limit compression of the grommets 185 under typical loads, such as when one or two human hands are rested on the touch sensor surface 112 and/or when two hands enter keystrokes (e.g., "type") across the touch sensor surface 112.

Figure 11A:
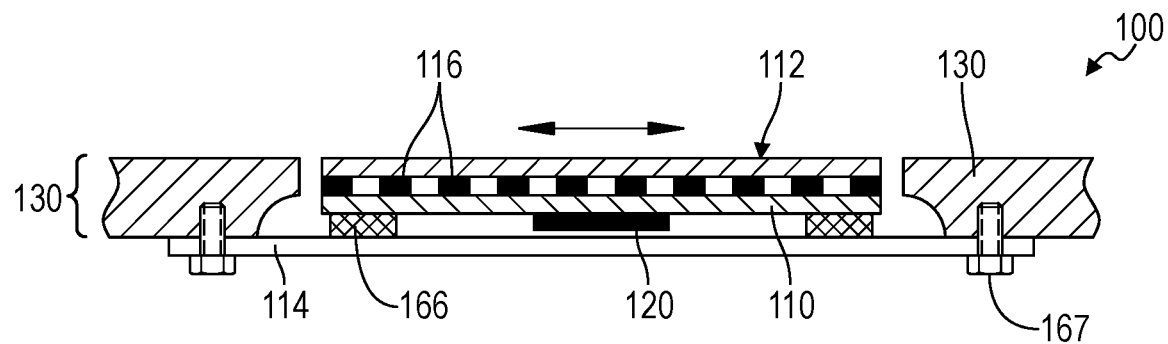
FIGS. 11A-11H are schematic representations of variations of the system.
Figure 11B:
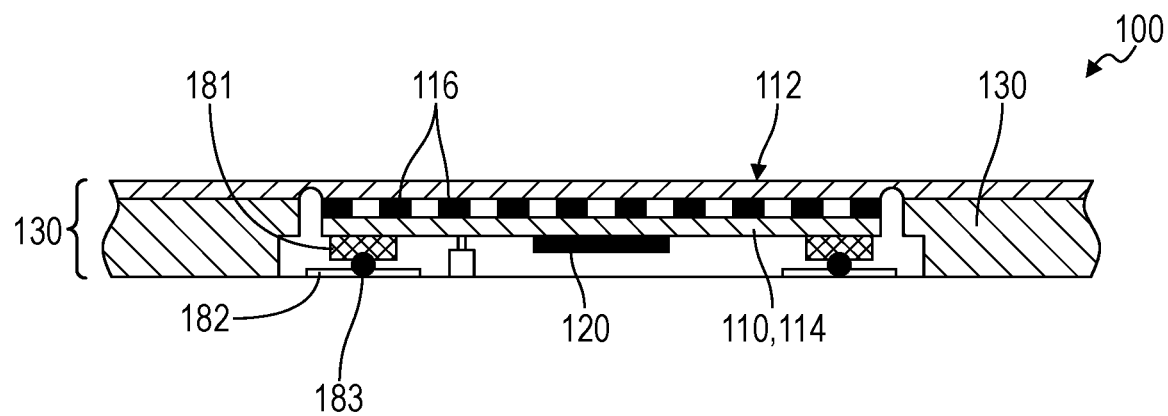
Figure 11C:
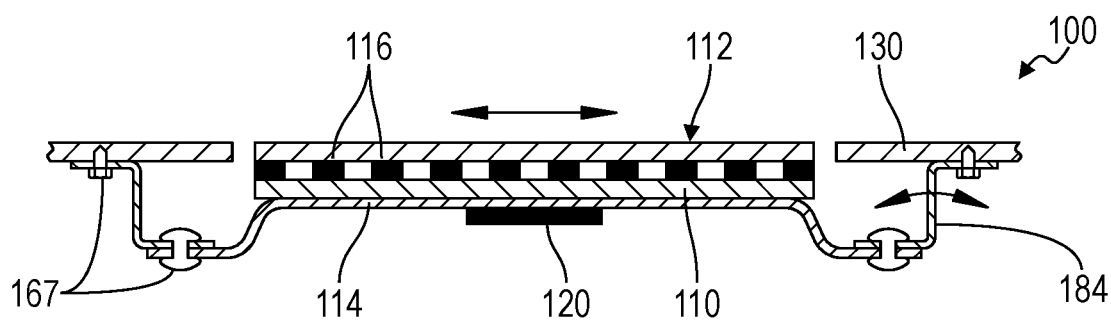
Figure 11D:
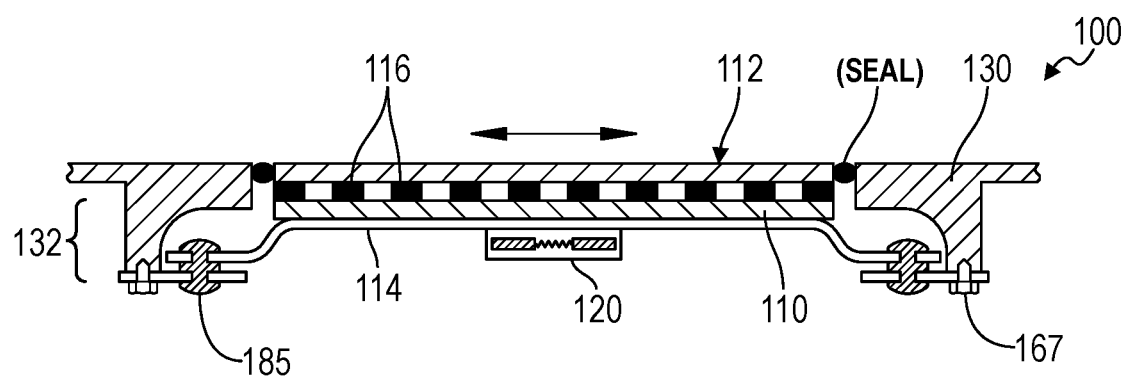
Figure 11E:
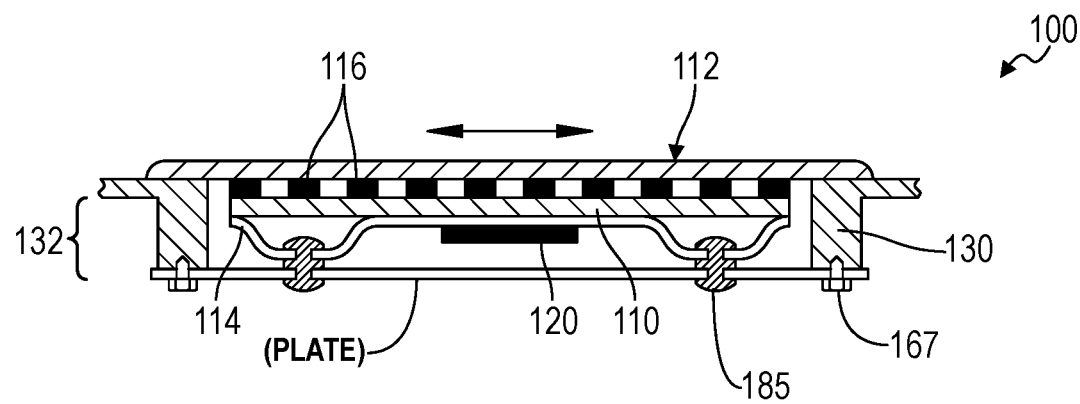
Figure 11F:
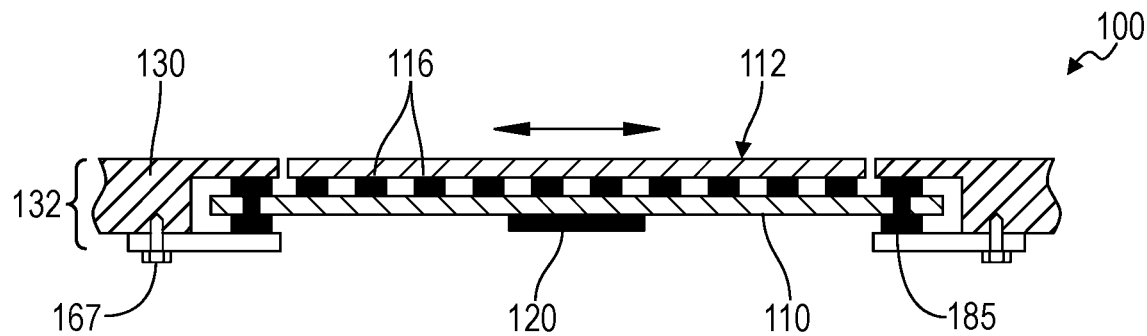
Figure 11G:
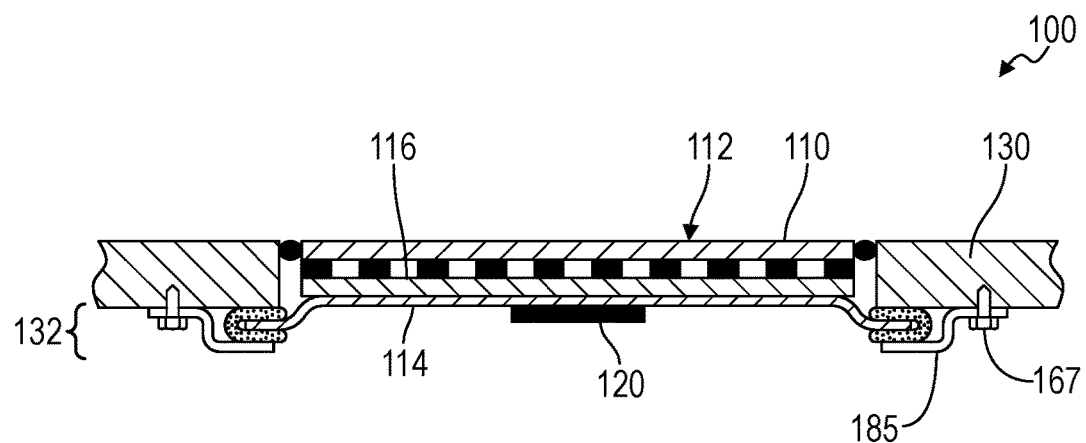

In another example shown in FIG. 11F, the coupler 132 includes one cylindrical grommet 185—including a single neck—inserted into a bore at each corner of the substrate 114. In this example, the coupler 132 also includes one rigid tab per grommet 185 or a rigid frame or rigid plate that spans the substrate 114. The tabs, frame, or plate are installed behind the substrate 114 to constrain the grommets 185 vertically against the computing device chassis 130. During a click cycle, the grommets 185 can thus bend or flex to enable the substrate 114 to move within the vibration plane as the vibrator 120 is actuated. The computing device chassis 130 and/or the tabs, frame, or plate can also include grommet 185 recesses configured to receive ends of the grommets 185 and to locate the grommets 185 laterally and longitudinally within the computing device receptacle. Each grommet 185 recess can define a cylindrical recess oversized for the cylindrical grommets 185 to enable the grommets 185 to move both laterally and longitudinally, thereby enabling the substrate 114 to move both laterally and longitudinally within the vibration plane during a click cycle. Similarly, each grommet 185 recess can define an elongated (or "lozenge") recess that enables the grommets 185 to move only laterally (or only longitudinally) within the grommet 185 recesses, thereby enabling the substrate 114 to move laterally (or longitudinally) within the vibration plane during a click cycle.

In this implementation, a grommet 185 can thus define a solid flexible body. Alternatively, a grommet 185 can include a rigid or elastic body and a flexure 186 arranged inside (or outside) of the body. In this implementation, the grommet 185 can couple the substrate 114 (or touch sensor surface 112) to the computing device chassis 130, and the flexure 186 can be configured to move relative to the body to enable the substrate 114 to shift laterally and/or longitudinally relative to the chassis 130. Alternatively, the system 100 can include one or more fluid-filled and/or ribbed grommets 185 that permit greater compression and compliance. For example, the grommet 185 can include a set of internal radial ribs that permit greater deflection in the vibration plane than out of the vibration plane.

Therefore, in this implementation: the vibrator 120 can be coupled to the touch sensor surface 112 of the touch sensor 110 (e.g., proximal a center of the touch sensor 110) and can include a linear actuator configured to oscillate the mass along a vector parallel to the touch sensor surface 112 and parallel to an edge of the touch sensor 110; and the coupler 132 can include a grommet 185 extending from the chassis 130 of the mobile computing device and passing through a mounting bore in the touch sensor surface 112, configured to vertically constrain the touch sensor surface 112 relative to the chassis 130, and exhibiting elasticity in a direction parallel to the touch sensor surface 112. However, in this implementation, the coupler 132 can include any other number of grommets 185 in any other configuration. For example, the coupler 132 can include: three grommets 185 in a triangular configuration; four grommets 185 in a square configuration with one grommet 185 in each corner of the substrate 114 or touch sensor surface 112; or six grommets 185 with one grommet 185 in each corner of the substrate 114 (or in the touch sensor surface 112) and one grommet 185 centered along each long side of the substrate 114 (or along each long side of the touch sensor surface 112). The system 100 can thus define a complete human-computer interface subsystem that can be installed in a computing device receptacle with a limited number of fasteners or with an adhesive.

7.3 Isolators

In another implementation shown in FIG. 11A, the coupler 132 includes elastic isolators 166 bonded to the back side of the substrate 114 (or to the back side of the touch sensor surface 112) and to a surface within the computing device receptacle. In one example, the coupler 132 includes a set of (e.g., four) silicone buttons bonded to the back side of the touch sensor surface 112 on one side and bonded to the bottom of the computing device receptacle. In this example, the silicone buttons can be in compression when a force is applied to the touch sensor surface 112; the silicone buttons can therefore define a geometry and a modulus of elasticity sufficient to substantially resist compression when a force is applied to the touch sensor surface 112 but to also enable the substrate 114 to translate in the vibration plane during a click cycle. Alternatively, in this implementation, the coupler 132 can include elastic isolators bonded to the top of the substrate 114 (or to the top of the touch sensor surface 112) and bonded to the underside of the top of the C-side of the computing device extending into the computing device receptacle, and the elastic isolators can suspend the substrate 114 within the receptacle. In one example described below, the isolator 166 can couple to the touch sensor surface 112 between a first region and a second region of a split keyboard and can be configured to limit communication of vibration between the first region and the second region of the touch sensor surface 112.

7.4 Bearings

In yet another implementation shown in FIG. 11B, the coupler 132 mounts the substrate 114 (or the touch sensor surface 112) to the computing device chassis 130 via a set of bearings. In one example, the computing device receptacle can include multiple bearing receivers, the substrate 114 can include one bearing surface 181 vertically aligned with each bearing receiver 182 and arranged across the back side of the substrate 114 opposite the touch sensor surface 112, and the coupler 132 can include one ball bearing 183 arranged in each bearing receiver 182 and configured to vertically support the substrate 114 at corresponding bearing surfaces on the back side of the substrate 114.

In another example, the computing device receptacle defines 24 bearing receivers arranged in a 3×8 grid array spaced along the back side of the substrate 114, and the coupler 132 includes one ball bearing 183 arranged in each bearing receiver 182. In this example, the bearings can support the substrate 114 (or the touch sensor surface 112) with a limited maximum span between adjacent bearings in order to limit local deflection of the substrate 114 when a load (of a typical magnitude) is applied to the touch sensor surface 112. The coupler 132 can thus include multiple bearings that function as a thrust bearing to vertically support the substrate 114. However, in this implementation, the computing device can include any other number of bearings arranged in any other way.

Figure 11H:
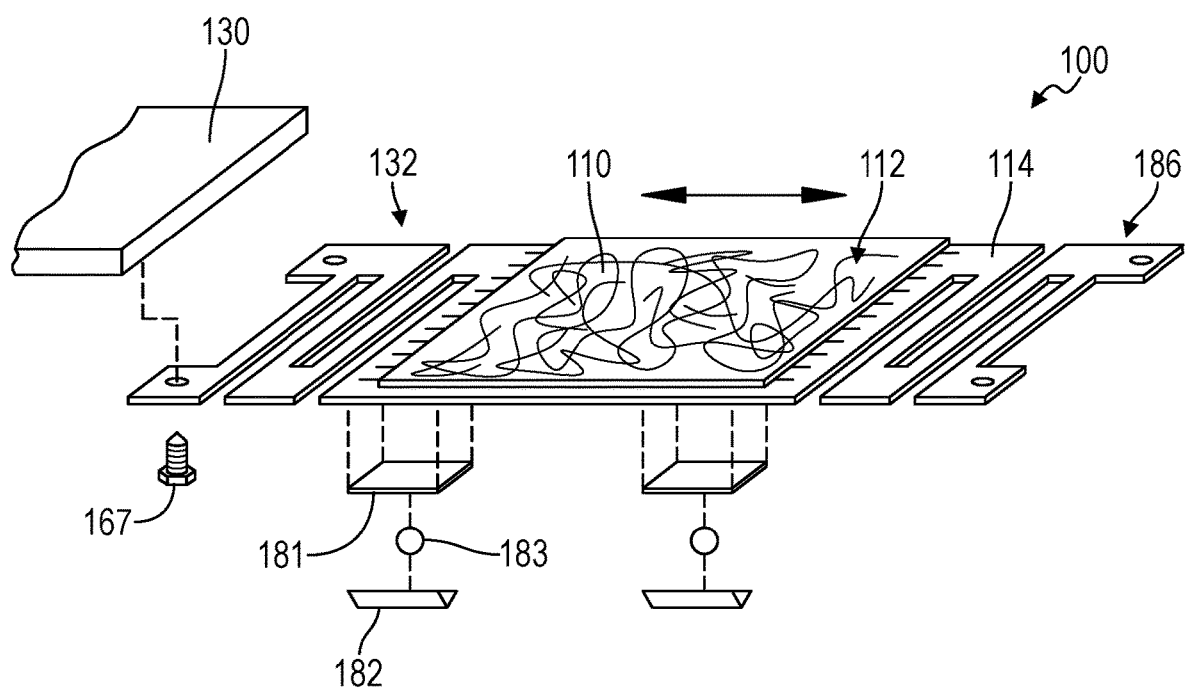

In this implementation, each bearing receiver 182 can define a hemispherical cup that constrains a ball bearing 183 in translation, and the substrate 114 can include steel or polymer planar bearing surfaces soldered, adhered, or otherwise mounted to the back side of the substrate 114 (or the back side of the touch sensor surface 112) and configured to mate with an adjacent ball bearing 183 at a point of contact, as shown in FIG. 11H. Alternatively, each bearing surface 181 mounted to the substrate 114 (or on the touch sensor surface 112) can define a linear track (e.g., a V-groove), wherein all linear tracks in the set of bearing surfaces are parallel such that the substrate 114 can translate in a single direction parallel to the linear tracks and in the vibration plane during a click cycle (or vice versa), as shown in FIG. 11B. The bearing receivers and bearing surfaces can also define similar and parallel linear tracks that constrain the substrate 114 to translate along a single axis, or the bearing receivers and bearing surfaces can define similar but perpendicular linear tracks that enable the substrate 114 to translate along two axes in the vibration plate. Furthermore, each bearing receiver 182 can be packed with a wet or dry lubricant (e.g., graphite).

In this implementation, the coupler 132 can alternatively include one or more linear bearing or linear slides that similarly constrain the substrate 114 to linear translation along only one or two axes.

Furthermore, the coupler 132 can incorporate one or more bearings with any of the foregoing implementations to provide additional support to the substrate 114 (or to the touch sensor surface 112). For example, if the substrate 114 is arranged in a receptacle spanning a large width and/or large length relative to the thickness and rigidity (e.g., modulus of elasticity) of the substrate 114 (or of the touch sensor surface 112): the computing device receptacle can include one or more bearing receivers; the substrate 114 can include one bearing surface 181 aligned with each bearing receiver 182 in the computing device receptacle on the back side of the substrate 114 opposite the resistive layer 124; and the coupler 132 can include four spring clips 184 suspending each of the four corners of the substrate 114 from the chassis 130 and one ball bearing 183 arranged in each bearing receiver 182 and configured to vertically support the substrate 114 at corresponding bearing surfaces on the back side of the substrate 114.

8. Keyboard

Figure 6:
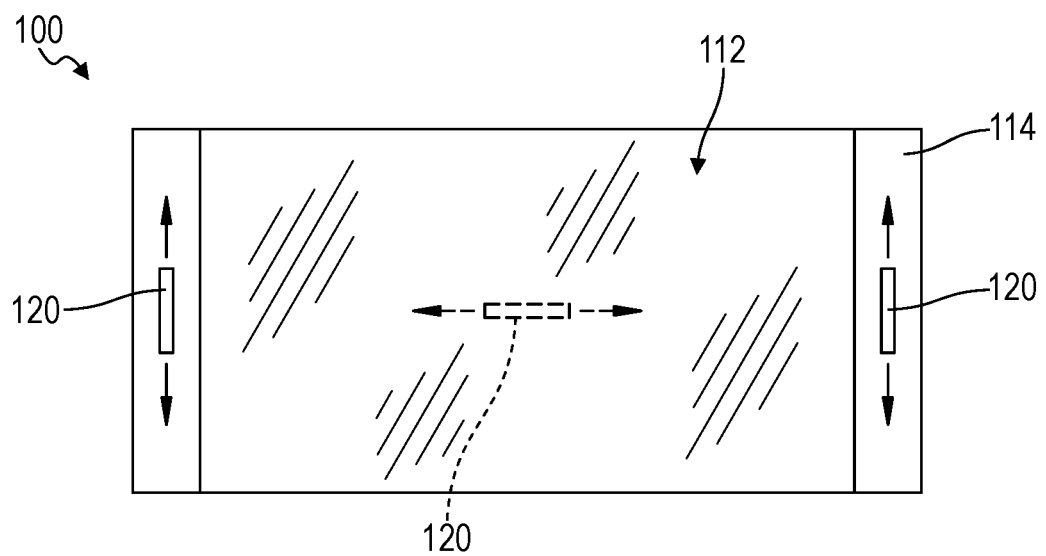
FIG. 6 is a schematic representation of one variation of the system.

In one implementation shown in FIG. 6, the system 100 defines a rectangular keyboard, includes multiple vibrators (or vibrator 120 pairs, vibrator 120 clusters) mounted to opposite ends of the substrate 114, and is mounted to the chassis 130 of a computing device (e.g., a laptop) by flexible grommets 185, a flexure 186, a linear bearing, or other element or features that enable the substrate 114 to vibrate within a vibration plane substantially parallel to the touch sensor surface 112, such as to oscillate along an X-axis, to oscillate along a Y-axis, and to rotate about a Z-axis of the substrate 114.

8.1 Unitary Keyboard Structure

In one implementation, the system 100 includes: a left vibrator 120 mounted on a region of the substrate 114 adjacent the lower-left corner of the keyboard; and a right vibrator 120 mounted on a region of the substrate 114 adjacent the lower-right corner of the keyboard, wherein both the left and right vibrators oscillate their internal eccentric masses parallel to the vibration plane. In the implementation described above in which each vibrator 120 oscillates its eccentric mass along a one-dimensional linear oscillation path, the left and right vibrators can be arranged on the substrate 114 with their oscillation paths parallel to the Y-axis of the substrate 114 (e.g., parallel to the short edges of the substrate 114), as shown in FIGS. 1, 2, and 6. When an input is detected on the touch sensor surface 112, the controller 150 selectively triggers the vibrator 120 nearest the input to execute a click cycle. In particular, when an input—exceeding a minimum threshold total or peak force—is detected on the right half of the touch sensor surface 112, the controller 150 triggers the right vibrator 120 to execute a click cycle, which locally oscillates right the side substantially parallel to the Y-axis of the substrate 114 and causes the substrate 114 to oscillate globally about the left side of the substrate 114, such as about a flexure 186 or about two elastic grommets 185 supporting the left side of the substrate 114 on the chassis 130 of the connected computing device. In particular, when the right vibrator 120 is actuated during a click cycle, the right vibrator 120 can oscillate the right side of the substrate 114 at a greater magnitude than the left side of the substrate 114—thereby rotating the substrate 114 about the left side of the substrate 114 and in the vibration plane, as shown in FIG. 2—such that a user resting fingers on the right and left sides of the touch sensor surface 112 tactilely may perceive a stronger response (e.g., a stronger "click") with a finger in contact with the right side of the touch sensor surface 112 than with a finger in contact with the left side of the touch sensor surface 112. The controller 150 can similarly trigger the left vibrator 120 to execute a click cycle when an input of sufficient force magnitude is detected on the left side of the touch sensor surface 112. The left and right vibrators can therefore be coupled to the substrate 114 with their linear oscillation paths substantially parallel to the short sides of the substrate 114 in order to leverage the aspect ratio of the keyboard and such that actuation of one of the left and right vibrators induces oscillation preferentially on the left or right side of the substrate 114, respectively.

The system 100 can further include a center vibrator 120 coupled to the substrate 114 under the approximate center of the touch sensor surface 112, as shown in FIG. 6; and the controller 150 can selectively trigger the center vibrator 120 to execute a click cycle in response to a touch input—of sufficient force magnitude—proximal the center of the touch sensor surface 112. The controller 150 can thus define three discrete, non-overlapping zones across the touch sensor surface 112—including a left zone, a right zone, and a center zone—and selectively trigger the left, right, and center vibrators to execute click cycles in response to inputs within these regions, respectively. Alternatively, the controller 150 can trigger the left and center vibrators or the right and center vibrators in combination based on the proximity of a detected input to the left, right, and center vibrators in order to achieve a greatest oscillation amplitude near the location of the input that triggered the click cycle. For example, the controller 150 can: define eleven discrete column regions from the left side of the touch sensor surface 112 to the right side of the touch sensor surface 112; trigger the left vibrator 120 to execute a click cycle at 100% power (e.g., 100% amplitude) in response to a touch input on the first (i.e., leftmost) column region; trigger the left vibrator 120 to execute a click cycle at 80% power and trigger the center vibrator 120 to execute a click cycle at 20% power in response to a touch input on a second column region; trigger the left vibrator 120 to execute a click cycle at 60% power and trigger the center vibrator 120 to execute a click cycle at 40% power in response to a touch input on a third column region. The controller 150 can then trigger the center vibrator 120 to execute a click cycle at 100% power in response to a touch input on the sixth (i.e., center) column region; trigger the right vibrator 120 to execute a click cycle at 20% power and trigger the center vibrator 120 to execute a click cycle at 80% power in response to a touch input on a seventh column region; and trigger the right vibrator 120 to execute a click cycle at 100% power in response to a touch input on the eleventh (e.g., rightmost) column region. In another example, the controller 150 can assign a left vibrator 120 power level, a combination of left and center vibrator 120 power levels, a combination of right and center vibrator 120 power levels, or a right vibrator 120 power level to each discrete key region defined across the touch sensor surface 112 based on a distance from the centroid of the key region to each of the left, right, and center vibrators and trigger the left, right, and center vibrators to execute click cycles at these power levels assigned to discrete key regions depressed by a user.

In the foregoing implementation, the center vibrator 120 can be arranged on the substrate 114 with its linear oscillation paths parallel to the X-axis of the substrate 114 (e.g., substantially perpendicular to the linear oscillation paths of the left and right vibrators). During a click cycle, the left and right actuators can therefore oscillate the left and right sides of the substrate 114 substantially parallel to the Y-axis of the substrate 114, respectively, and the center vibrator 120 can oscillate the substrate 114 substantially parallel to the X-axis of the substrate 114. Because a flexure 186, elastic grommet 185, or other structure coupling the substrate 114 to the chassis 130 of a computing device is more compliant to rotation about the Z-axis of the substrate 114 than to linear movement along the X-axis of the substrate 114, the center vibrator 120 can be larger (e.g., include a large eccentric mass and/or larger actuator) than the left and right actuators in order to achieve similar local oscillation magnitudes when the left, right, and center vibrators execute click cycles.

8.2 Split Keyboard

Figure 3:
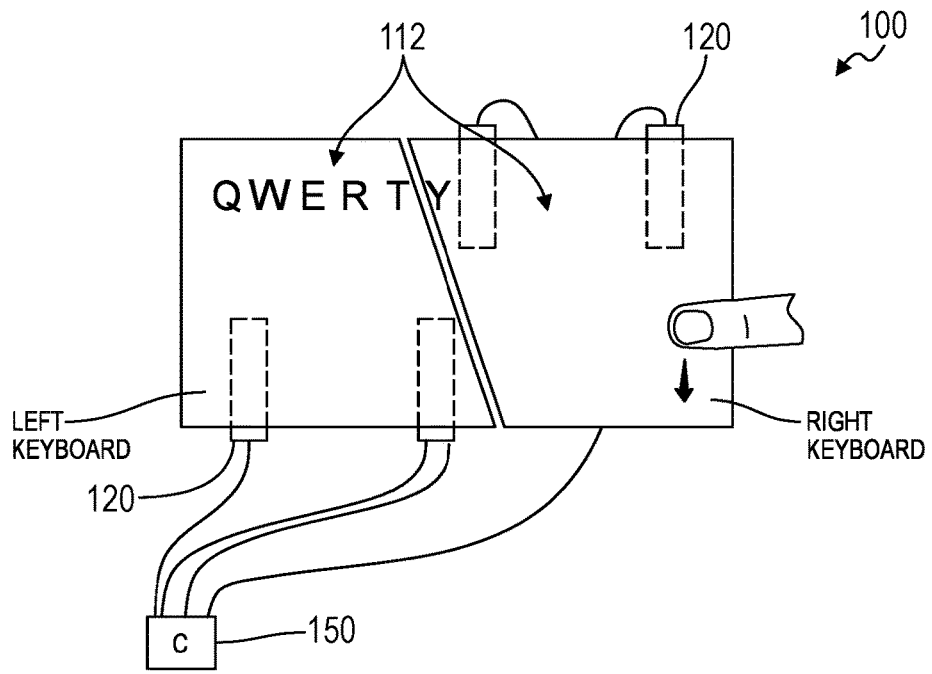
FIG. 3 is a schematic representation of one variation of the system.

In one variation shown in FIG. 3, the system 100 includes two (or more) discrete touch sensor 110s, each with one or more vibrators (or vibrator 120 pairs or vibrator 120 clusters, as described below) that cooperate to define a full keyboard. In one implementation, the system 100 includes: a left touch sensor 110, a left vibrator 120 coupled to a left substrate 114 of the left touch sensor 110, a left resistive layer 124 arranged over the left substrate 114, and a left overlay 164 arranged over the left resistive layer 124 and defining a left touch sensor surface 112 across a left half of a keyboard; and a right touch sensor 110 separate from the left touch sensor 110, a right vibrator 120 coupled to a right substrate 114 of the right touch sensor 110, a right resistive layer 124 arranged over the right substrate 114 and separate from the left resistive layer 124, and a right overlay 164 arranged over the right resistive layer 124, separate from the left overlay 164, and defining a right touch sensor surface 112 across a right half of the keyboard. The left and right touch sensor 110s can thus be constructed on separate (i.e., distinct) substrates 114 that are separately connected to a common chassis 130 of a computing device, the left vibrator 120 can oscillate the left touch sensor 110 separately from the right touch sensor 110, and the right vibrator 120 can oscillate the right touch sensor 110 separately from the left touch sensor 110.

In this variation, the controller 150 can selectively trigger the left vibrator 120 to execute a click cycle when a touch input of sufficient magnitude is detected by the left touch sensor 110 to vibrate the left substrate 114, and the controller 150 can trigger the right vibrator 120 to execute a click cycle when a touch input of sufficient magnitude is detected by the right touch sensor 110 to vibrate the right substrate 114. Thus, a flexure 186, elastic grommet 185 or other structure that couples the left touch sensor 110 to the chassis 130 of the computing device can substantially isolate the vibration of the left touch sensor 110 from the right touch sensor 110 (and vice versa) such that a user contacting the left touch surface with fingers on his left hand and contacting the right touch surface with fingers on his right hand may perceive a haptic response with his left fingers but not with his right fingers when depressing the left touch sensor 110.

In this variation, each of the left and right touch sensor 110s can define a rectangular section, a trapezoidal section, a polygonal section, or a skewed or stepped area spanning a subset (e.g., one half) of a keyboard area. The left and right touch sensor 110s can also be separately mounted to the computing device chassis 130, and the system 100 can include a single vibrator 120 coupled to each of the left and right substrates 114. Alternately, the system 100 can include multiple vibrators coupled to each of the left and right substrates 114, and the controller 150 can selectively trigger vibrators coupled to the left touch sensor 110 based on the location of an input on the left touch sensor 110—such as according to methods and techniques described above—in order to maximize oscillation of the left touch sensor 110s near the location of the input with greater granularity. The controller 150 can similarly selectively trigger vibrators coupled to the right touch sensor 110 based on the location of a second input on the right touch sensor 110 in order to maximize oscillation of the right touch sensor 110s near the location of the second input.

Furthermore, in this variation, the system 100 can include one discrete overlay 164 per touch sensor 110. Alternatively, the system 100 can include one overlay 164 that spans both touch sensor 110s, such as if the overlay 164 is of a relatively elastic material or includes an elastic section spanning a gap between the left and right touch sensor 110s in order to limit mechanical communication of vibrations between the left and right touch sensor 110s.

For example, the touch sensor 110 can define: a first region of the touch sensor surface 112 corresponding to a first subset of keys of the keyboard (e.g., a left half of the keyboard); and a second region of the touch sensor surface 112 adjacent the first region and corresponding to a second subset of keys of the keyboard (e.g., a right half of the keyboard). In this example, a first vibrator 120 can be configured to oscillate the first region of the touch sensor surface 112 in isolation (i.e., without moving the second region of the touch sensor surface 112) while a second vibrator 120 can be coupled to the touch sensor 110 and configured to oscillate the second region of the touch sensor surface 112 in isolation. To limit communication of vibration between the first region and the second region, the system 100 can include an isolator 166 (e.g., elastic divider and/or gap interposed between the first region and the second region), as described above, coupled to the touch sensor surface 112 between the first region and the second region and configured to limit communication of vibration between the first region and the second region of the touch sensor surface 112. In this example, the controller 150 is configured to: execute a first down-click cycle in response to the first force magnitude exceeding the first threshold magnitude by driving the first vibrator 120 to oscillate the first region of the touch sensor surface 112 in Block S120; and map the first location of the first input on the touch sensor surface 112 to a key in the first subset of keys of the keyboard in response to detecting application of the first input onto the touch sensor surface 112 within the first region of the touch sensor surface 112. Alternatively, the controller 150 can, in response to detecting application of the first input onto the touch sensor surface 112 within the second region of the touch sensor surface 112: execute a second down-click cycle in response to the first force magnitude exceeding a second threshold magnitude by driving the second vibrator 120 to oscillate the second region of the touch sensor surface 112, the second threshold magnitude distinct from the first force magnitude in Block S120; and map the first location of the first input on the touch sensor surface 112 to a key in the second subset of keys of the keyboard. Therefore, the system 100 can selectively vibrate the first region and/or the second region in response to detecting inputs in each corresponding region.

Furthermore, in the foregoing example, the controller 150 can detect application of a second input onto the touch sensor surface 112 and a second force magnitude of the second input at approximately the first time based on a second change in resistance between a second sense electrode and drive electrode pair 116 in the touch sensor 110. In response to detecting application of the first input onto the touch sensor surface 112 within the first region at approximately the first time and detecting application of the second input onto the touch sensor surface 112 within the first region of the touch sensor surface 112 at approximately the first time, the controller 150 can execute a third down-click cycle in response to the first force magnitude exceeding the first threshold magnitude by driving the first vibrator 120 to oscillate the first region proximal the first input at a first frequency. At the approximately same time, the controller 150 can execute a fourth down-click cycle in response to the first force magnitude exceeding a second threshold magnitude by driving the second vibrator 120 to oscillate the second region of the touch sensor surface 112 at a second frequency distinct from the first frequency.

However, in this variation, the system 100 can include any other number of touch sensor 110s arranged in any other way, including any other number of vibrators, and cooperating to span a full keyboard area.

8.3 Keyboard Surface and Overlay

The touch sensor surface 112 can define a keyboard region and can further include key designators (e.g., alphanumeric characters, punctuation characters) printed onto or otherwise applied to or formed into discrete key regions across the keyboard region of the touch sensor surface 112, such as a white ink screen-printed across the touch sensor surface 112. The system 100 can additionally or alternatively include key designators and/or region designators embossed or debossed across the touch sensor surface 112 to enable a user to tactilely discriminate between various regions across the touch sensor surface 112.

Alternatively, the system 100 can include a keyboard overlay 164—including visually- or mechanically-distinguished discrete key regions—installed over the keyboard region of the touch sensor surface 112 to define commands or inputs linked to various discrete input regions within the keyboard region. In this implementation, the keyboard overlay 164 can be transiently installed on (i.e., removable from) the keyboard region of the touch sensor surface 112, such as to enable a user to exchange a first keyboard overlay 164 defining a QWERTY keyboard layout with a second keyboard overlay 164 defining an AZERTY keyboard layout. In this implementation, depression of a discrete key region of an overlay 164 placed over the keyboard region of the touch sensor surface 112 can locally compress the resistive layer 124, which can modify the bulk resistance and/or the contact resistance of the resistive layer 124 on the drive and sense electrodes; and the controller 150 can register such change in bulk resistance and/or contact resistance of the resistive layer 124 as an input, associate a particular keystroke with this input based on the location of the input, output the keystroke to a processing unit within the connected or integrated computing device, and trigger a click cycle. For example, the controller 150 can designate discrete key regions of a keyboard (e.g., 26 alphabetical key regions, 10 numeric key regions, and various punctuation and control keys) and can trigger a click cycle and output a keystroke command in response to a detected input on a corresponding discrete key region of the keyboard.

9. Soft Overlay

Figure 4:
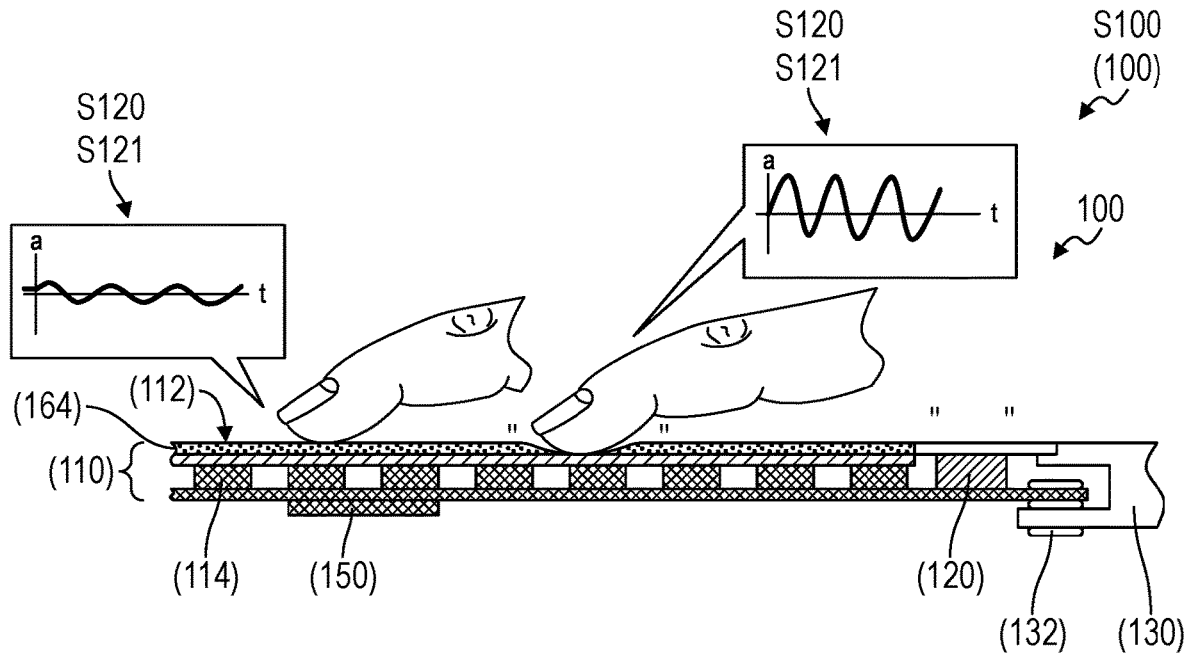
FIG. 4 is a schematic representation of one variation of the system.

In the foregoing variation in which the system 100 includes an overlay 164 arranged over the resistive layer 124 and defining the touch sensor surface 112, the overlay 164 can define a layer of a relatively elastic (or "soft") material that compresses along the Z-axis of the touch sensor 110 when depressed by a finger or other object. As a user depresses a finger to the touch sensor surface 112, the overlay 164 compresses toward the substrate 114, thereby yielding increased mechanical coupling (or less damping) between the user's finger and the substrate 114 and greater communication of vibrations from the substrate 114 into the user's finger during a click cycle executed by a vibrator 120 nearby in response to detection of the input on the touch sensor surface 112, as shown in FIG. 4. In this implementation, the modulus of elasticity of the overlay 164 material can be selected or modified to achieve a minimum local compression (e.g., 50% compression) of the overlay 164 in the Z-axis when an input applied to the touch sensor surface 112 reaches a threshold peak or total force magnitude sufficient to trigger the controller 150 to actuate a vibrator 120 nearby. For example, the overlay 164 can include a closed-cell silicone foam sheet. In this example, the overlay 164 can: define a three-dimensional keyboard form defining a set of demarcated keys; be configured to transiently install over the touch sensor surface 112; and can comprise an elastic material configured to communicate a force applied to a surface of the three-dimensional keyboard form downward onto the touch sensor surface 112.

In one implementation, the overlay 164 includes a foam pad of uniform thickness (e.g., 0.025") and uniform durometer (e.g., Shore 25) faced on a first side of a textile (e.g., fabric, leather) and mounted over the touch sensor 110 on an opposing side. In this implementation, the touch sensor 110 can define a relatively rigid structure (e.g., Shore 80 or greater), and the overlay 164 can define a relatively supple (e.g., deformable, flexible, elastic, compressible) layer over the touch sensor 110. The textile can thus define a control surface offset above the touch sensor surface 112 by the foam pad, and the foam pad (and the textile) can compress between a finger and the touch sensor surface 112 as a user depresses the control surface with her finger. Because the touch sensor 110 is configured to detect a range of magnitudes of forces applied to the touch sensor surface 112, the touch sensor 110 can detect such input. Also, though the foam pad may disperse the applied force of the user's finger over a greater contact area from the control surface to the touch sensor surface 112, the controller 150 can sum input forces calculated at discrete sensor pixels across the touch sensor 110 to calculate a total force applied to the control surface. The controller 150 can also calculate the centroid of a contiguous cluster of discrete sensor pixels that registered a change in applied force to determine the force center of the input.

In the foregoing implementation, the control layer of the overlay 164 can also include embossed regions, debossed regions, decals, etc. that define tactile indicators of active regions of the touch sensor 110, inactive regions of the touch sensor 110, functions output by the system 100 in response to inputs on such regions of the control surface, etc.

In another implementation, the overlay 164 includes a pad of varying thickness faced on a first side in a textile and mounted over the touch sensor 110 on an opposing side. In one example, the pad includes a foam structure of uniform durometer and defining a wedge profile that tapers from a thick section proximal the posterior end of the touch sensor 110 to a thin section proximal the anterior end of the touch sensor 110. In this example, due to the varying thickness of the pad, the pad can communicate a force applied near the posterior end of the control surface into the touch sensor 110 onto a broader area than a force applied near the anterior end of the control surface; the system 100 can thus exhibit greater sensitivity to touch inputs applied to the control surface nearer the anterior end than the posterior end of the control surface. In another example, the pad similarly includes a foam structure or other compressible structure defining a wedge profile that tapers from a thick section proximal the posterior end of the touch sensor 110 to a thin section proximal the anterior end of the touch sensor 110. However, in this example, the foam structure can exhibit increasing durometer from its posterior end to its anterior end to compensate for the varying thickness of the pad such that the system 100 exhibits substantially uniform sensitivity to touch inputs across the control surface.

However, the overlay 164 can define any other uniform thickness or varying thickness over the touch sensor surface 112. For example, the overlay 164 can define a domed or hemispherical profile over the (planar) touch sensor surface 112. The overlay 164 can also be faced with any other textile or other material. The system 100 can then implement methods and techniques described above to detect inputs on the control surface—translated onto the touch sensor surface 112 by the overlay 164—and to output control functions according to these inputs.

Furthermore, because the compression of the overlay 164 by a user's finger increases mechanical coupling between the substrate 114 and the finger (or decreases damping of vibrations communicated from the substrate 114 into the user's finger), the user may perceive greater actuation of the vibrator 120 at the finger currently depressed into the overlay 164 than at other fingers only resting on or lightly depressing the overlay 164 during a click cycle. In this variation, the system 100 can therefore include a "soft" overlay 164—over the resistive layer 124—that functions to selectively improve local mechanical coupling between the substrate 114 and a primary object (e.g., a finger) depressing the overlay 164 while also damping or limiting mechanical coupling between the substrate 114 and other objects only lightly in contact with the overlay 164, thereby increasing preferential communication of vibration from the substrate 114 into the primary object during a click cycle.

However, the soft overlay 164 can be of any other material and can function in any other way to modify transmission of vibrations from the substrate 114 into objects in contact with the touch sensor surface 112.

10. Multiple Vibrators

In the foregoing implementation, the system 100 can include multiple speakers and multiple vibrators and can selectively trigger click cycles at the speakers and vibrators in response to inputs on the keyboard region of the touch sensor surface 112. In one example in which the controller 150 triggers a motor driver to drive a vibrator 120 for a target click duration of 250 milliseconds during a click cycle, the system 100 can include a vibrator 120 cluster containing three discrete vibrators coupled to each half of the substrate 114 in order to enable the system 100 to execute one complete click cycle on a corresponding side of the keyboard for each of 480 keystrokes per minute (i.e., 8 Hz keystroke input rate). In this example, the system 100 can include: a left vibrator 120 cluster arranged on the back side of the substrate 114 under or adjacent the left side of the keyboard and a right vibrator 120 cluster arranged on the back side of the substrate 114 under or adjacent the right side of the keyboard; and the controller 150 can default to triggering a primary vibrator 120 in each of the left and right vibrator 120 clusters to execute a click cycle in response to an input on a corresponding half of the keyboard region. However, if the primary controller 150 in the left vibrator 120 cluster is still completing a click cycle when a next input on the left side of the keyboard region is detected or if the primary vibrator 120 in the left vibrator 120 cluster completed a click cycle less than a threshold pause time (e.g., 100 milliseconds) from a current time upon receipt of a next input on the left half of the keyboard region of the touch sensor surface 112, the controller 150 can trigger a secondary vibrator 120 in the left vibrator 120 cluster to execute a click cycle in response to this next input on the left half of the keyboard region. In this example, the controller 150 can implement similar methods to trigger a tertiary vibrator 120 in the left vibrator 120 cluster to execute a click cycle in response to a next input on the left half of the keyboard region if the primary and secondary vibrators in the left vibrator 120 cluster are still completing click cycles upon receipt of this next input. Alternatively, the controller 150 can sequentially actuate a first vibrator 120, a second vibrator 120, and a third vibrator 120 in the left vibrator 120 cluster as inputs are sequentially detected on the touch sensor surface 112. The controller 150 can implement similar methods and techniques to trigger vibrators in the right vibrator 120 cluster to execute click cycles based on inputs detected on the right half of the keyboard region.

Yet alternatively, in this implementation, the system 100 can include discrete vibrators distributed across the back surface of the substrate 114, such as one vibrator 120 in each of three equi-width column regions on the back side of the substrate 114, and the controller 150 can selectively trigger a vibrator 120—nearest a detected input on the touch sensor surface 112 and not currently executing a click cycle—to execute a click cycle in response to detection of this detected input.

For example, the system 100 can include a first vibrator 120 arranged proximal a first edge of the touch sensor surface 112 and configured to oscillate the touch sensor surface 112 relative to a chassis 130 coupled to the touch sensor 110. In this example, the first vibrator 120 can vibrate the touch sensor surface with vibration originating proximal the first edge and translating the touch sensor surface 112 in a first direction parallel the touch sensor surface 112. Similarly, the system 100 can include a second vibrator 120 coupled to the touch sensor surface 112, arranged proximal a second edge of the touch sensor surface 112 opposite the first edge, and configured to oscillate the touch sensor surface 112 relative to the chassis 130, vibration originating proximal the second edge and translating the touch sensor surface 112 in a second direction orthogonal the first direction and parallel the touch sensor surface 112. The controller 150 can, in response to detecting application of the first input onto the touch sensor surface 112 at the first location of the touch sensor surface 112, the first force magnitude of the first input exceeding the first threshold magnitude: drive the first vibrator 120 to oscillate the touch sensor surface 112 at approximately the first time in response to the first location falling a first distance from the first vibrator 120 and a second distance from the second vibrator 120 less than the first distance; and/or drive the second vibrator 120 to oscillate the touch sensor surface 112 at approximately the first time in response to the first location falling a third distance from the first vibrator 120 and a fourth distance from the second vibrator 120 greater than the third distance. Therefore, the first and second vibrators can vibrate the touch sensor surface 112 in different directions and at different frequencies based on proximity of an input to each vibrator 120. Thus, each vibrator 120 can cooperate to mimic the sensation of depression of a mechanical key.

Alternatively, the controller 150 can, in response to detecting application of the first input onto the touch sensor surface 112 proximal the first edge: at approximately the first time, drive the first vibrator 120 to oscillate the touch sensor surface 112 at a first frequency and a first amplitude, the first amplitude and the first frequency proportional to the first force magnitude while simultaneously driving the second vibrator 120 to oscillate the touch sensor surface 112 at a second frequency and a second amplitude, the second frequency less than the first frequency and the second amplitude less than the first amplitude. In this example, in response to detecting application of the first input onto the touch sensor surface 112 proximal the second edge, the controller 150 can, at approximately the first time, drive the second vibrator 120 to oscillate the touch sensor surface 112 at a third frequency and a third amplitude, the third amplitude and the third frequency proportional to the first force magnitude; and drive the first vibrator 120 to oscillate the touch sensor surface 112 at a fourth frequency and a fourth amplitude in response to the first force magnitude exceeding the first threshold magnitude, the fourth frequency less than the third frequency and the fourth amplitude less than the third amplitude. Therefore, the controller 150 can actuate multiple vibrators simultaneously at different frequencies and in different directions based on proximity of an input to an origin of vibration.

In another variation, the controller 150 can select a first vibrator 120 from a set of vibrators coupled to the touch sensor surface 112, the first vibrator 120 proximal (e.g., nearest) the first location of the touch input on the touch sensor surface 112. The controller 150 can then actuate the first vibrator 120 at a first oscillation frequency proportional to the first force magnitude and over a first duration corresponding to the first force magnitude. Alternatively, in response to the second threshold magnitude exceeding the second force magnitude at approximately the second time, the controller 150 can select a second vibrator 120 from the set of vibrators distinct from the first vibrator 120, the second vibrator 120 more proximal the first location than the first vibrator 120. Then the controller 150 can actuate the second vibrator 120 according to the up-click cycle in Block S132 at a second oscillation frequency distinct from the first oscillation frequency and over a second duration distinct from the first duration.

However, in the foregoing example, the controller 150 can detect application of a second input onto the touch sensor surface 112 at a second location of the touch sensor surface 112 and a third force magnitude of the second input at a time coinciding with oscillation of the first vibrator 120 (i.e., while the first vibrator 120 is currently vibrating in response to application of the first touch input). The controller 150 can remove the first vibrator 120 from the set of vibrators to define a compressed (or abridged) set of vibrators coupled to the touch sensor surface 112 and available to oscillate the touch sensor surface 112, the first vibrator 120 nearest the second location in the set of vibrators. The controller 150 can then select the second vibrator 120 from the compressed set of vibrators nearest the second location and actuate the second vibrator 120 according to the down-click cycle. Later, the controller 150 can detect a force magnitude of the second input corresponding to retraction of the input from the touch sensor surface; and, in response to the threshold magnitude exceeding the force magnitude of retraction of the second input, the controller 150 can map the second location of the second input on the touch sensor surface 112 to a second particular key of the keyboard associated with a region of the touch sensor surface 112; and output an identifier of the second particular key and the second force magnitude of the second input on the touch sensor surface 112.

The controller 150 can implement similar methods and techniques to trigger one or more speakers within the system 100 or within the computing device to execute a click cycle in response to an input detected on the touch sensor surface 112. For example, the system 100 can include one or more discrete speakers coupled to (e.g., mounted on) the substrate 114. Alternatively, the controller 150 can trigger one or more speakers (e.g., one or more audio monitors) integrated into the computing device containing or connected to the system 100 or another speaker or audio drive remote from the substrate 114 to execute a click cycle in response to a detected input on the touch sensor surface 112.

However, the controller 150 can implement any other method or technique to detect and to respond to inputs on the keyboard region of the touch sensor surface 112. Furthermore, the system 100 can implement methods and techniques described above to vibrate the substrate 114 in a direction substantially normal to the touch sensor surface 112 (i.e., out of the vibration plane described above.)

11. Overlay Vibrator

In one variation, the touch sensor 110 is mounted rigidly to a chassis 130 (e.g., to a computing device chassis 130), and the system 100 includes: an overlay 164 arranged over and disconnected from the resistive layer 124; and one or more vibrators configured to oscillate the overlay 164 relative to the touch sensor 110 and substantially parallel to the substrate 114. In this variation, the overlay 164 can be located over the touch sensor 110 by a flexure 186, by an elastic membrane, or by any other structure extending from the chassis 130 or from the substrate 114 to one or more edges of the overlay 164 such that the overlay 164 can float over and move relative to the resistive layer 124, such as up to 0.5 millimeter in each direction along a linear oscillation path of the vibrator 120. The vibrator 120 can be coupled to an edge of the overlay 164 and can oscillate the overlay 164 over and relative to the resistive layer 124 when executing a click cycle triggered by the controller 150. For example, when a user depresses a first finger into the overlay 164 while typing, the user's first finger may constrain (or "pinch") the adjacent region of the overlay 164 against the resistive layer 124; when the force magnitude of the first finger on this first region of the overlay 164 exceeds a threshold minimum force, the controller 150 can trigger the vibrator 120 to execute a click cycle. As the vibrator 120 oscillates, sections of the overlay 164 outside of the first region in contact with the user's first finger may oscillate relatively freely; however, with the first region of the overlay 164 constrained by and mechanically coupled to the first finger, the first region of the overlay 164 can communicate vibrations from the vibrator 120 into the user's first finger, thus providing the user with a sensation of haptic feedback at this first finger. For the user's other fingers that may be resting but not depressing other sections of the overlay 164, the overlay 164 may oscillate under these fingers, though lack of substantial mechanical coupling between the overlay 164 and the user's other fingers may limit the magnitude of vibrations communicated into and detected by the user such that the user perceives haptic feedback—actually originating at the vibrator 120—to stem from a mechanical button or vibrator 120 directly below the user's finger.

In this variation, the system 100 can include multiple vibrators coupled to the overlay 164, such as one vibrator 120 on each lateral side of the overlay 164, one vibrator 120 on the longitudinal side of the overlay 164, and/or multiple vibrators interspersed along the perimeter of the overlay 164. The controller 150 can implement methods and techniques described above to trigger one or a select subset of vibrators—near an input detected on the touch sensor surface 112—to execute click cycles.

Figure 5:
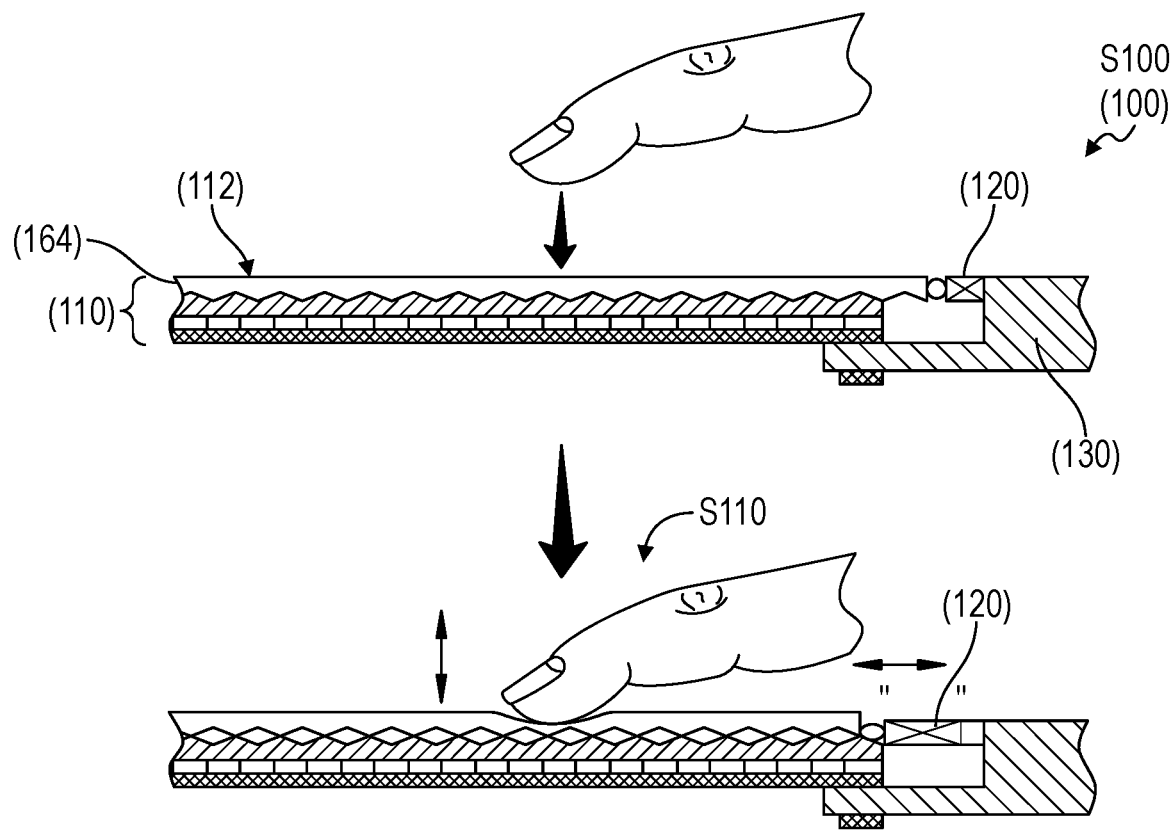
FIG. 5 is a flowchart representation of one variation of the system.

In this variation, the vibrator 120 (or each of multiple vibrators) can include: a piezoelectric actuator; an electromechanical solenoid with a return spring; an electromechanical linear actuator; a linear resonant actuator; or another actuator coupled directly to the overlay 164. Alternatively, the vibrator 120 (or each of multiple vibrators) can be coupled to the overlay 164 remotely, such as via a linkage, cable, or other drive mechanism. Furthermore, the underside of the overlay 164 and/or the top of the resistive layer 124 (or top of another layer interposed between the overlay 164 and the resistive layer 124) can define a variegated (e.g., serrated) profile such that, when the vibrator 120 oscillates the overlay 164 across the resistive layer 124 in the vibrator 120 plane, the overlay 164 also oscillates along the Z-axis of the touch sensor 110, as shown in FIG. 5. For example, a crinkle spray coating can be applied over the back of the overlay 164 and over the top of the resistive layer 124 to form a low-stiction but rough interface between the overlay 164 and the resistive layer 124 such that the overlay 164 grates against the resistive layer 124—and thus oscillates vertically—when moved within the vibration plane by the vibrator 120(s) during a click cycle. In this example, the coatings or surface finishes on the back of the overlay 164 and/or the top of the resistive layer 124 (or other layer interposed between the overlay 164 and the resistive layer 124) can be of a magnitude corresponding to a target oscillating amplitude of the overlay 164 during a click cycle.

However, in this variation, the system 100 can include any other number of vibrators and/or other any other feature to communicate haptic feedback through an overlay 164 configured to oscillate over and relative to the touch sensor 110.

12. Magnetic Coil Vibrator

In one variation, the vibrator 120 includes a magnetic coil mounted to the substrate 114 and a magnetic (or ferrous) element coupled to the chassis 130 of the computing device, or vice versa. For example, the magnetic element can be potted into a recess in the computing device chassis 130 in order to reduce the total height of the system 100 and computer system. Alternatively, the vibrator 120 can include: a magnetic coil arranged within a recess in the computing device chassis 130; and the system 100 can include a magnetic element fastened (e.g., riveted, bonded, soldered) to the substrate 114. During a click cycle, the controller 150 drives the magnetic coil with an alternating current, which causes the magnetic coil to output an alternating magnetic field that magnetically couples to the magnetic element (e.g., like a voice-coil), thereby oscillating the substrate 114 in the vibration plane and relative to the chassis 130. For example, the system 100 can include two discrete touch sensor 110s, each with one (or more) magnetic coil paired with one (or more) magnetic element and corresponding to one half of a keyboard. In this example, the controller 150 can selectively trigger the magnetic coil coupled to the left touch sensor 110 to execute a click cycle when the left touch sensor 110 detects an input, and the controller 150 can selectively trigger the magnetic coil coupled to the right touch sensor 110 to execute a click cycle when the tight touch sensor 110 detects an input.

In another example, the system 100 includes: a single touch sensor 110 that defines a keyboard, a left magnetic coil mounted to the left side of the keyboard (e.g., adjacent the left edge of substrate 114) and paired with a left magnetic element arranged in the computing device chassis 130; and a right magnetic coil mounted to the right side of the keyboard (e.g., adjacent the right edge of substrate 114) and paired with a right magnetic element arranged in the computing device chassis 130. In this example, the controller 150 can trigger the left magnetic coil to execute a click cycle but leave the right magnetic coil dormant when the left touch sensor 110 detects an input in order to primarily vibrate the left side of the substrate 114, to cause the left side of the substrate 114 to pivot about the right side of the substrate 114, and to preferentially communicate this vibration into a finger in contact with the left side of the touch sensor surface 112 over another finger or object in contact with the right side of the touch sensor surface 112.

In a similar variation in which the system 100 includes a discrete overlay 164 over the touch sensor 110 and oscillates the overlay 164 in response to detection of an input on the overlay 164, the system 100 includes a magnetic coil arranged on the substrate 114 (or in the computing device chassis 130), and the overlay 164 include a magnetic (or ferrous) insert, or vice versa. For example, the overlay 164 can include a bar magnet, a steel wire, a ferrous rod, or other magnetic or ferrous element embedded in the overlay 164 over the magnetic coil and extending along one side of the overlay 164. During a click cycle, the magnetic coil can output an oscillating magnetic field that magnetically couples to the magnetic or ferrous element to oscillate the overlay 164—parallel to the vibration plane—relative to the substrate 114. In this example, the system 100 can include a second magnetic or ferrous element embedded or otherwise coupled to the opposite end of the overlay 164 and a second magnetic coil that magnetically couples to the second magnetic or ferrous element and cooperates with the (first) magnetic coil to oscillate the overlay 164 laterally during a click cycle.

In a similar example, the overlay 164 includes multiple linear ferrous or magnetic elements embedded in the overlay 164, defining axes parallel to the short edges of the substrate 114, and offset along the width of the overlay 164. In this example, the system 100 also includes multiple magnetic coils arranged across the center and/or perimeter of the substrate 114. During a click cycle, the controller 150 can thus trigger all magnetic coils to output oscillating magnetic fields that couple with and laterally oscillate adjacent magnetic or ferrous element in the overlay 164 in order to oscillate the overlay 164 at a relatively large amplitude during the click cycle. Alternatively, during a click cycle, the controller 150 can selectively trigger one or a subset of magnetic coils nearest an input detected on the overlay 164 to output an oscillating magnetic field in order to preferentially oscillate a local region of the overlay 164 nearest the input.

Alternatively, ferrous or magnetic particulate can be impregnated, embedded, or molded into the overlay 164, such as uniformly across the width and length of the overlay 164 or selectively in discrete blocks, rows, or columns along the width and length of the overlay 164. In this implementation, the system 100 can also include one or more magnetic coils arranged on the substrate 114. When triggered by the controller 150 during a click cycle, a magnetic coil can output an oscillating magnetic field that couples to magnetic or ferrous particles in an adjacent region of the overlay 164, which can cause the overlay 164 to oscillate—locally or globally—relative to the substrate 114.

13. Inputs Between Keys

In one variation, the controller 150 can: detect an input on the touch sensor surface 112 between discrete regions bounding keys of a keyboard surface overlaid on the touch sensor 110; and selectively actuate one or more vibrators to mimic nearly simultaneous depression of multiple mechanical keys. In this variation, the controller 150 can selectively drive the set of vibrators in order to achieve a target vibration frequency and magnitude at the location of the touch input between designated keys, such as by tuning frequencies, phases, amplitudes, and/or duration of these vibrators to instigate user's impression of simultaneous depression of multiple mechanical keys.

For example, the controller 150 can detect application of the first input onto the touch sensor surface 112 at the first location corresponding to an interstitial between (and/or overlapping) a first key and a second key of the keyboard. The controller 150 can then, in response to a second distance between the first location and a boundary of the second key of the keyboard exceeding a first distance between the first location and a boundary of the first key of the keyboard, actuate the first vibrator 120 at a first frequency and a first amplitude defined as a function of the first force magnitude and proximity to the first key, the first vibrator 120 assigned to the first key and oscillating a region of the touch sensor surface 112 including and surrounding the first key. In response to the first distance exceeding the second distance, the controller 150 can actuate a second vibrator 120 coupled to the touch sensor surface 112 at a second frequency and a second amplitude defined as a function of the first force magnitude and proximity to the second key, the second vibrator 120 assigned to the second key and oscillating a region of the touch sensor surface 112 comprising and surrounding the second key.

However, the controller 150 can map inputs interposed between discrete keys of the keyboard surface to any other command and can actuate vibrators and/or audio drivers 140 to generate corresponding haptic feedback to mimic simultaneous depression of multiple mechanical keys of a mechanical keyboard in any other suitable way.

14. Trackpad+Keyboard

In one variation in which the computing device defines a laptop computer, the computing device includes a receptacle spanning substantially the full width and length of its C-side, the system 100 can define both a trackpad region and a keyboard region, as shown in FIGS. 12A and 12B. In this variation, the controller 150 can implement the foregoing methods and techniques to respond to inputs on a trackpad region by triggering a click cycle and outputting a click command, a cursor vector, or a scroll command, etc. In this variation, the controller 150 can designate discrete key regions of a keyboard (e.g., 26 alphabetical key regions, 10 numeric key regions, and various punctuation and control keys) and can trigger a click cycle and output a keystroke command in response to a detected input on a corresponding discrete key region of the keyboard.

In one implementation, the touch sensor surface 112 defines a continuous surface across the keyboard and trackpad regions, and the system 100 includes key designators (e.g., alphanumeric characters, punctuation characters) printed onto or otherwise applied to discrete key regions across the keyboard region of the touch sensor surface 112, such as a white ink screen-printed across the touch sensor surface 112. In this implementation, the system 100 can also include borders for the discrete key regions and/or for the trackpad region designated in such ink. The system 100 can additionally or alternatively include key designators and/or region designators embossed or debossed across the touch sensor surface 112 to enable a user to tactilely discriminate between various regions across the touch sensor surface 112. Yet alternatively, the system 100 can include a keyboard overlay 164—including visually- or mechanically-distinguished discrete key regions—installed over the keyboard region of the touch sensor surface 112 to define commands or inputs linked to various discrete input regions within the keyboard region. In this implementation, the keyboard overlay 164 can be transiently installed on (i.e., removable from) the keyboard region of the touch sensor surface 112, such as to enable a user to exchange a first keyboard overlay 164 defining a QWERTY keyboard layout with a second keyboard overlay 164 defining an AZERTY keyboard layout. In this implementation, depression of a discrete key region of an overlay 164 placed over the keyboard region of the touch sensor surface 112 can locally compress the resistive layer 124, which can modify the bulk resistance and/or the contact resistance of the resistive layer 124 on the drive and sense electrodes; and the controller 150 can register such change in bulk resistance and/or contact resistance of the resistive layer 124 as an input, associate a particular keystroke with this input based on the location of the input, output the keystroke to a processing unit within the computing device, and trigger a click cycle.

In this variation, the trackpad region can be interposed between the keyboard region and a near edge of the C-side of the computing device and may run along a substantial portion of the width of the keyboard region such that a user may rest her palms on the trackpad when typing on the keyboard. During operation, the controller 150 can characterize an input on the trackpad as a palm and reject such an input in favor of inputs on the keyboard region in order to record keystrokes rather than cursor movements when a user is typing on the keyboard region. For example, the controller 150 can implement pattern matching or template matching techniques to match one or more input areas detected on the trackpad region of the touch sensor surface 112 with one or two palms, and the controller 150 can reject these inputs. In this example, the controller 150 can confirm identification of an input area as corresponding to a resting palm (e.g., confirm a match between an input area and a labeled palm template) in response to detection of one or a sequence of inputs (e.g., "keystrokes") on the keyboard region of the touch sensor surface 112; and vice versa. The system 100 can also capture input areas on the trackpad region, store these input areas as new template images, label these new template images as indicative of a resting palm or not indicative of a resting palm based on detection of a keystroke on the keyboard area following within a threshold time (e.g., three seconds) of detection of an input area on the trackpad region. However, the controller 150 can implement any other palm rejection methods or techniques and can implement any other method or technique to automatically train a palm rejection model.

Furthermore, the system 100 can transform an input detected within the trackpad region of the touch surface as one of various commands, such as based on the initial location, final location, speed, force (or pressure) magnitude, etc. of the input on the touch surface. For example, the controller 150 can interpret an input on the touch surface as one of a click, deep-click scroll, zoom, and cursor motion commands based on methods and techniques described above. In this example, the controller 150 can interpret a first force applied to the trackpad region—up to a first depression threshold magnitude defining a click input within the trackpad region—followed by release of the first force from the trackpad region (i.e., to less than a first release threshold magnitude less than the first depression threshold magnitude) as a selection (or "left click") input. The controller 150 can then output a selection (or "left click") command and execute a "down" click cycle and then an "up" click cycle accordingly, such as through a first vibrator 120 under the trackpad region of the touch sensor surface 112.

Similarly, the controller 150 can interpret a second force applied to the trackpad region—up to a second depression threshold magnitude defining a "deep" click (or "right click") input within the trackpad region—followed by release of the second force from the trackpad region (i.e., to less than the first release threshold magnitude) as a "deep click" input as shown in FIG. 10B. The controller 150 can then output a "deep click" (or "right click") command and execute a "deep down" click cycle and then an "up" click cycle accordingly through the first vibrator 120.

Furthermore, the controller 150 can interpret a third force applied to the keyboard region—up to a third depression threshold magnitude defining a click input within the keyboard region (e.g., less than the first depression threshold magnitude)—as a keystroke for a character assigned to the location of the third force on the touch sensor surface 112; the controller 150 can then output this keystroke and execute a single "down" click cycle through a second vibrator 120 under the keyboard region of the touch sensor surface 112. The controller 150 can repeatedly output the keystroke until release of the third force from the keyboard region (i.e., to less than a second release threshold magnitude less than the second depression threshold magnitude) is detected and then execute an "up" click cycle accordingly.

The controller 150 can also interpret two distinct touch inputs moving toward one another or moving away from one another on the touch sensor surface 112 as a zoom-out input or as a zoom-in input, respectively. Furthermore, the controller 150 can generate a cursor vector based on a speed and direction of an input moving across the touch sensor surface 112 and output these cursor vectors to a processing unit or other controller 150 within the computing device substantially in real-time.

However, the controller 150 can detect any other inputs of any other form or type on the touch sensor surface 112 and respond to these inputs in any other way.

15. Additional Sensing

In one variation, the system 100 includes a capacitive sensor, optical sensor, magnetic displacement sensor, strain gauge, FSR, or any other sensor coupled to the chassis 130 and/or to the substrate 114 and configured to detect displacement of the substrate 114 in the vibration (e.g., X-Y) plane responsive to a force applied to the touch sensor surface 112. The controller 150 can then output a command based on such in-plane displacement or force applied to the touch sensor surface 112.

Similarly, the system 100 can include a capacitive sensor, optical sensor, magnetic displacement sensor, strain gauge, FSR, or any other sensor coupled to the chassis 130 and/or to the substrate 114 and configured to detect absolute displacement of the substrate 114 out of the vibration plane (i.e., along a Z-axis), as shown in FIG. 11C. In this variation, the controller 150 can transform a determined absolute displacement of the substrate 114 into an absolute magnitude of a force applied to the touch sensor surface 112 based on a known spring constant of the coupler 132. The controller 150 can then compare this absolute force magnitude to relative force magnitudes of objects in contact with the touch sensor surface 112 in order to calculate the absolute force magnitude of each object in contact with the touch sensor surface 112 at any one time. The controller 150 can then output a command for one or more touch inputs on the touch sensor surface 112 accordingly.

However, the system 100 can be incorporated into any other type of computing device in any other way.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system comprising:
   a touch sensor comprising a set of sense electrode and drive electrode pairs and a substrate;
   a tactile surface arranged over the touch sensor;
   a first vibrator coupled to the touch sensor;
   a spacer arranged below the touch sensor and configured to yield to displacement of the substrate during oscillation of the tactile surface; and
   a controller configured to:
      read a first set of force values from the set of sense electrode and drive electrode pairs;
      interpret a first input on the tactile surface;
      interpret a first force magnitude of the first input at a first time based on the first set of force values;
      execute a down-click cycle by driving the first vibrator to oscillate the tactile surface in response to the first force magnitude exceeding a first threshold magnitude;
      interpret a second force magnitude of the first input at a second time succeeding the first time based on the first set of force values;
      execute an up-click cycle by driving the first vibrator to oscillate the tactile surface in response to the second force magnitude falling below a second threshold magnitude less than the first threshold magnitude;
      read a second set of force values from the set of sense electrode and drive electrode pairs;
      interpret a second input on the tactile surface;
      interpret a third force magnitude of the second input based on the second set of force values; and
      execute a deep click cycle by driving the first vibrator to oscillate the tactile surface in response to the deep force magnitude exceeding a deep force threshold magnitude greater than the first threshold magnitude.

2. The system of claim 1:
   wherein the set of sense electrode and drive electrode pairs comprises a grid array of sense electrode and drive electrode pairs that is continuous across the substrate; and
   further comprising a force-sensitive material that defines a continuous layer extending over the touch sensor.

3. The system of claim 1, wherein the controller is configured to:
   execute the down-click cycle in response to the first force magnitude exceeding the first threshold magnitude of 120 grams; and
   execute the up-click cycle in response to the second force magnitude falling below the second threshold magnitude of 60 grams.

4. The system of claim 1:
   wherein the tactile surface defines a surface of a keyboard; and
   wherein the controller is further configured to:
      map a location of the first input to a first key of the keyboard; and
      output a touch image representing the first force magnitude of the first input and the first key at approximately the first time.

5. The system of claim 4:
   wherein the tactile surface comprises:
      a first region associated with a first subset of keys of the keyboard; and
      a second region adjacent the first region and associated with a second subset of keys of the keyboard; and
   further comprising an isolator coupled to the tactile surface and configured to limit transmission of vibration between the first region and the second region of the tactile surface;
   wherein the first vibrator is coupled to the first region of the tactile surface and is configured to oscillate the first region of the tactile surface; and
   further comprising a second vibrator coupled to the second region of the tactile surface and configured to oscillate the second region within a plane parallel to the tactile surface.

6. The system of claim 5, wherein the controller is further configured to:
   in response to interpreting the first input on the first region of the tactile surface:
      drive the first vibrator to oscillate the first region of the tactile surface during the down-click cycle; and
      map the location of the first input to the first key in the first subset of keys of the keyboard; and
   in response to interpreting the second input on the second region of the tactile surface:
      drive the second vibrator to oscillate the second region of the tactile surface during a second down-click cycle in response to a third force magnitude of the second input exceeding the first threshold magnitude; and
      map a location of the second input to a second key in the second subset of keys of the keyboard.

7. The system of claim 1:
   further comprising a second vibrator coupled to the tactile surface and configured to oscillate the tactile surface within a plane parallel to the tactile surface; and
   wherein the controller is further configured to:
      drive the first vibrator to oscillate the touch sensor surface proximal the first input during the down-click cycle at approximately the first time in response to detecting application of the first input at a first distance from the first vibrator, and at a second distance, greater than the first distance, from the second vibrator; and
      drive the second vibrator to oscillate the touch sensor surface proximal the first input during the down-click cycle at approximately the first time in response to detecting application of the first input at a third distance from the first vibrator, and at a fourth distance, less than the third distance, from the second vibrator.

8. The system of claim 1:
further comprising a chassis;
wherein the spacer couples the touch sensor to the chassis;
wherein the first vibrator is arranged proximal a first edge of the tactile surface and configured to oscillate the tactile surface relative to the chassis by translating the tactile surface along a first axis parallel to the tactile surface; and
further comprising a second vibrator coupled to the tactile surface arranged proximal a second edge of the tactile surface opposite the first edge and configured to oscillate the tactile surface relative to the chassis by translating the tactile surface along a second axis orthogonal to the first axis and parallel to the tactile surface.

9. The system of claim 8, wherein the controller is further configured to, in response to detecting application of the first input at a first location on the tactile surface, the first force magnitude of the first input exceeding the first threshold magnitude:
in response to the first location falling a first distance from the first vibrator and a second distance from the second vibrator less than the first distance, execute the down-click cycle by driving the first vibrator to oscillate the tactile surface with a first amplitude at approximately the first time and driving the second vibrator to oscillate the tactile surface with a second amplitude greater than the first amplitude at approximately the first time.

10. The system of claim 1:
further comprising a force-sensitive material arranged over the touch sensor; and
wherein the controller is configured to:
  interpret the first force magnitude of the first input at the first time, based on a first change in resistance between a first sense electrode and drive electrode pair in the touch sensor;
  drive the first vibrator to oscillate the tactile surface at a first frequency over a first duration;
  interpret the second force magnitude of the first input at the second time, based on a second change in resistance between the first sense electrode and drive electrode pair in the touch sensor; and
  drive the first vibrator to oscillate the tactile surface at a second frequency over a second duration, the second frequency greater than the first frequency, and the second duration less than the first duration.

11. A system comprising:
a touch sensor comprising a set of sense electrode and drive electrode pairs and a substrate;
a tactile surface arranged over the touch sensor;
a first vibrator configured to oscillate the tactile surface; and
a controller coupled to the touch sensor and the first vibrator configured to:
  read a first set of force values from the set of sense electrode and drive electrode pairs;
  interpret a first input on the tactile surface;
  interpret a first force magnitude of the first input at a first time based on a first change in electrical values between a first sense electrode and drive electrode pair in the set of sense electrode and drive electrode pairs;
  execute a down-click cycle by driving the first vibrator to oscillate the tactile surface in response to the first force magnitude exceeding a first threshold magnitude;
  interpret a second force magnitude of the first input at a second time succeeding the first time based on a second change in electrical values between the first sense electrode and drive electrode pair in the set of sense electrode and drive electrode pairs; and
  execute an up-click cycle by driving the first vibrator to oscillate the tactile surface in response to the second force magnitude falling below a second threshold magnitude less than the first threshold magnitude.

12. The system of claim 11:
further comprising:
  a force-sensitive material arranged over the touch sensor; and
  a spacer arranged below the touch sensor and configured to yield to displacement of the substrate during oscillation of the tactile surface; and
wherein the controller is configured to:
  interpret the first force magnitude of the first input at the first time, based on the first change in electrical values representing a first change in resistance between the first sense electrode and drive electrode pair in the touch sensor;
  drive the first vibrator to oscillate the tactile surface at a first frequency over a first duration;
  interpret the second force magnitude of the first input at the second time, based on the second change in electrical values representing a second change in resistance between the first sense electrode and drive electrode pair in the touch sensor; and
  drive the first vibrator to oscillate the tactile surface at a second frequency over a second duration, the second frequency greater than the first frequency, and the second duration less than the first duration.

13. The system of claim 11:
wherein the tactile surface defines a surface of a keyboard; and
wherein the controller is further configured to:
  map a location of the first input to a key of the keyboard; and
  output a touch image representing the first force magnitude of the first input and the key at approximately the first time.

14. The system of claim 11:
wherein the set of sense electrode and drive electrode pairs comprises a grid array of sense electrode and drive electrode pairs that is continuous across the substrate;
wherein the first vibrator is configured to oscillate the tactile surface within a plane parallel to the tactile surface; and
further comprising:
  a force-sensitive material that defines a continuous layer extending over the touch sensor; and
  a spacer arranged below the touch sensor and configured to yield to displacement of the substrate during oscillation of the tactile surface within the plane parallel to the tactile surface.

15. The system of claim 11:
further comprising:
  a chassis; and
  a spacer coupling the touch sensor to the chassis;
wherein the first vibrator comprises:
  a magnetic coil mounted to the substrate; and
  a magnetic element coupled within a recess of the chassis; and
wherein the first vibrator is arranged proximal a first edge of the tactile surface and is configured to oscillate the tactile surface relative to the chassis by translating the tactile surface along a first axis parallel to the tactile surface.

16. The system of claim 11, wherein the controller is configured to:
   interpret a second input on the tactile surface;
   interpret a third force magnitude of the second input at a third time based on a third change in electrical values in the first set of force values;
   execute a deep click cycle by driving the first vibrator to oscillate the tactile surface in response to the third force magnitude exceeding a third force threshold magnitude greater than the first threshold magnitude.

17. A system comprising:
   a substrate;
   a first sense electrode and drive electrode pair arranged on the substrate;
   a tactile surface arranged over the substrate;
   a first vibrator configured to oscillate the tactile surface; and
   a controller configured to:
      read a first set of force values representing changes in electrical values between the first sense electrode and drive electrode pair on the substrate;
      interpret a first input on the tactile surface;
      interpret a first force magnitude of the first input at a first time based on a first change in electrical values in the first set of force values;
      execute a down-click cycle by driving the first vibrator to oscillate the tactile surface in response to the first force magnitude exceeding a first threshold magnitude;
      interpret a second force magnitude of the first input at a second time based on a second change in electrical values in the first set of force values; and
      execute an up-click cycle by driving the first vibrator to oscillate the tactile surface in response to the second force magnitude falling below a second threshold magnitude less than the first threshold magnitude.

18. The system of claim 17, further comprising:
   a force-sensitive material arranged over the substrate; and
   a spacer arranged below the substrate and configured to yield to displacement of the substrate during oscillation of the tactile surface.

19. The system of claim 17, wherein the controller is configured to:
   interpret the first force magnitude of the first input at the first time, based on the first change in electrical values representing a first change in resistance between the first sense electrode and drive electrode pair on the substrate;
   drive the first vibrator to oscillate the tactile surface at a first frequency over a first duration;
   interpret the second force magnitude of the first input at the second time, based on the second change in electrical values representing a second change in resistance between the first sense electrode and drive electrode pair in the touch sensor; and
   drive the first vibrator to oscillate the tactile surface at a second frequency over a second duration, the second frequency greater than the first frequency, and the second duration less than the first duration.

20. The system of claim 17, wherein the controller is configured to:
   interpret a second input on the tactile surface;
   interpret a third force magnitude of the second input at a third time based on a third change in electrical values in the first set of force values; and
   execute a deep click cycle by driving the first vibrator to oscillate the tactile surface in response to the third force magnitude exceeding a third force threshold magnitude greater than the first threshold magnitude.

\* \* \* \* \*